(12) United States Patent
Nakamura

(10) Patent No.: US 6,385,741 B1
(45) Date of Patent: May 7, 2002

(54) METHOD AND APPARATUS FOR SELECTING TEST SEQUENCES

(75) Inventor: Mitsuhiro Nakamura, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/320,338

(22) Filed: May 26, 1999

(30) Foreign Application Priority Data

Oct. 5, 1998 (JP) .......................................... 10-282552

(51) Int. Cl.[7] .............................................. G06F 11/263
(52) U.S. Cl. ................................ 714/38; 714/33; 717/9
(58) Field of Search ............................. 714/38–39, 37, 714/33–36, 51; 717/4, 9

(56) References Cited

U.S. PATENT DOCUMENTS 5,721,926 A * 2/1998 Tamura ........................ 717/1
5,828,829 A * 10/1998 Yamauchi et al. ............ 714/38

FOREIGN PATENT DOCUMENTS

| JP | 359151248 A | * | 8/1984 | ............ G06F/11/22 |
| JP | 403098123 A | * | 4/1991 | ............ G06F/9/44 |
| JP | 5-6272 | | 1/1993 | |
| JP | 5-66966 | | 3/1993 | |
| JP | 8-272649 | | 10/1996 | |
| JP | 10-3405 | | 1/1998 | |
| JP | 10-11274 | | 1/1998 | |

* cited by examiner

Primary Examiner—S. Baderman
(74) Attorney, Agent, or Firm—Rosenman & Colin LLP

(57) ABSTRACT

A method and an apparatus for selecting test sequences that comprises preparing tree-structured state transition data associated with state transition weights from state transition data, extracting test sequences from the tree-structured state transition data, and repeating processes of determining averaged weight for each of the test sequences, selecting a test sequence by which the average is maximum, and decrementing the weights contained in the selected test sequence by one unit to prioritize the test sequences.

14 Claims, 25 Drawing Sheets

TREE PREPARED WITHOUT JUNCTION

FIG.10

| STATE TRANSITION | | TESTED FLAG | WEIGHT |
|---|---|---|---|
| PRECEDING STATE | SUBSEQUENT STATE | | |
| A | B | 1 | 5 |
| B | C | 1 | 5 |
| C | D | 1 | 5 |
| B | I | 1 | 2 |
| B | E 1 | 1 | 5 |
| E 1 | F 1 | 1 | 3 |
| F 1 | G 1 | 1 | 3 |
| E 1 | H 1 | 1 | 1 |
| A | E 2 | 1 | 3 |
| E 2 | F 2 | 1 | 3 |
| F 2 | G 2 | 1 | 3 |
| E 2 | H 2 | 1 | 1 |

TESTED FLAG (1 : UNTESTED, 0 : TESTED)

FIG.11

TESTED FLAG (1 : UNTESTED, 0 : TESTED)

| STATE TRANSITION | | INITIAL STATE | PROCESS (1) | PROCESS (2) | PROCESS (3) | PROCESS (4) | PROCESS (5) | PROCESS (6) | PROCESS (7) | PROCESS (8) | PROCESS (9) | PROCESS (10) |
|---|---|---|---|---|---|---|---|---|---|---|---|---|
| PRECED-ING STATE | SUBSEQU-ENT STATE | | | | | | | | | | | |
| A | B | 1 | 0 | 0 | 0 | 0 | 0 | 0 | 0 | 0 | 0 | 0 |
| B | C | 1 | 0 | 0 | 0 | 0 | 0 | 0 | 0 | 0 | 0 | 0 |
| C | D | 1 | 0 | 0 | 0 | 0 | 0 | 0 | 0 | 0 | 0 | 0 |
| B | 1 | 1 | 1 | 1 | 1 | 1 | 1 | 1 | 1 | 1 | 0 | 0 |
| B | E1 | 1 | 1 | 1 | 0 | 0 | 0 | 0 | 0 | 0 | 0 | 0 |
| E1 | F1 | 1 | 1 | 1 | 0 | 0 | 0 | 0 | 0 | 0 | 0 | 0 |
| F1 | G1 | 1 | 1 | 1 | 1 | 0 | 1 | 0 | 0 | 0 | 0 | 0 |
| F1 | H1 | 1 | 1 | 1 | 1 | 1 | 0 | 0 | 0 | 0 | 0 | 0 |
| A | E2 | 1 | 1 | 1 | 0 | 0 | 0 | 0 | 0 | 0 | 0 | 0 |
| E2 | F2 | 1 | 1 | 1 | 0 | 0 | 0 | 0 | 0 | 0 | 0 | 0 |
| F2 | G2 | 1 | 1 | 1 | 0 | 0 | 0 | 0 | 0 | 0 | 0 | 0 |
| F2 | H2 | 1 | 1 | 1 | 1 | 1 | 1 | 0 | 0 | 0 | 0 | 0 |

——— UNTESTED TRANSITION
━━━ TESTED TRANSITION

| | TEST SEQUENCE | TOTAL WEIGHT | STATE TRANSITION NUMBER | AVERAGED WEIGHT | PRIORITY | ALL TRANSITION TESTED |
|---|---|---|---|---|---|---|
| ☆ | A-B-C-D | 15 | 3 | 5 | 1 | no |
| | A-B-I | 7 | 2 | 3.5 | | |
| | A-B-E1-F1-G1 | 16 | 4 | 4 | | |
| | A-B-E1-H1 | 11 | 3 | 3.6 | | |
| | A-E2-F2-G2 | 9 | 3 | 3 | | |
| | A-E2-H2 | 4 | 2 | 2 | | |

☆ NEWLY ENTERED

|   | TEST SEQUENCE | TOTAL WEIGHT | STATE TRANSITION NUMBER | AVERAGED WEIGHT | PRIORITY | ALL TRANSITION TESTED |
|---|---|---|---|---|---|---|
| ★ | A-B-C-D | 12 | 3 | 4 | 1 | no |
|   | A-B-I | 6 | 2 | 3 |   |   |
|   | A-B-E1-F1-G1 | 15 | 4 | 3.7 |   |   |
|   | A-B-E1-H1 | 10 | 3 | 3.3 |   |   |
|   | A-E2-F2-G2 | 9 | 3 | 3 |   |   |
|   | A-E2-H2 | 4 | 2 | 2 |   |   |

★ SELECTED BUT ALREADY ENTERED

———— UNTESTED TRANSITION
━━━ TESTED TRANSITION

|   | TEST SEQUENCE | TOTAL WEIGHT | STATE TRANSITION NUMBER | AVERAGED WEIGHT | PRIORITY | ALL TRANSITION TESTED |
|---|---|---|---|---|---|---|
|   | A-B-C-D | 9 | 3 | 3 | 1 | no |
|   | A-B-I | 5 | 2 | 2.5 |  |  |
| ☆ | A-B-E1-F1-G1 | 14 | 4 | 3.5 | 2 | no |
|   | A-B-E1-H1 | 9 | 3 | 3 |  |  |
|   | A-E2-F2-G2 | 9 | 3 | 3 |  |  |
|   | A-E2-H2 | 4 | 2 | 2 |  |  |

☆ NEWLY ENTERED

— UNTESTED TRANSITION
— TESTED TRANSITION

| | TEST SEQUENCE | TOTAL WEIGHT | STATE TRANSITION NUMBER | AVERAGED WEIGHT | PRIORITY | ALL TRANSITION TESTED |
|---|---|---|---|---|---|---|
| ★ | A-B-C-D | 8 | 3 | 2.7 | 1 | no |
| | A-B-I | 4 | 2 | 2 | | |
| | A-B-E1-F1-G1 | 10 | 4 | 2.5 | 2 | no |
| | A-B-E1-H1 | 7 | 3 | 2.3 | | |
| | A-E2-F2-G2 | 7 | 3 | 2.3 | | |
| | A-E2-H2 | 4 | 2 | 2 | | |

★ SELECTED BUT ALREADY ENTERED

——— UNTESTED TRANSITION
——— TESTED TRANSITION

| | TEST SEQUENCE | TOTAL WEIGHT | STATE TRANSITION NUMBER | AVERAGED WEIGHT | PRIORITY | ALL TRANSITION TESTED |
|---|---|---|---|---|---|---|
| | A-B-C-D | 5 | 3 | 1.7 | 1 | no |
| | A-B-I | 3 | 2 | 1.5 | | |
| | A-B-E1-F1-G1 | 9 | 4 | 2.2 | 2 | no |
| | A-B-E1-H1 | 6 | 3 | 2 | | |
| ☆ | A-E2-F2-G2 | 7 | 3 | 2.3 | 3 | no |
| | A-E2-H2 | 4 | 2 | 2 | | |

☆ NEWLY ENTERED

———— UNTESTED TRANSITION
━━━━ TESTED TRANSITION

|   | TEST SEQUENCE | TOTAL WEIGHT | STATE TRANSITION NUMBER | AVERAGED WEIGHT | PRIORITY | ALL TRANSITION TESTED |
|---|---|---|---|---|---|---|
|   | A-B-C-D | 5 | 3 | 1.6 | 1 | no |
|   | A-B-I | 3 | 2 | 1.5 |   |   |
|   | A-B-E1-F1-G1 | 7 | 4 | 1.7 | 2 | no |
| ☆ | A-B-E1-H1 | 6 | 3 | 2 | 4 | no |
|   | A-E2-F2-G2 | 4 | 3 | 1.3 | 3 | no |
|   | A-E2-H2 | 3 | 2 | 1.5 |   |   |

☆ NEWLY ENTERED

———— UNTESTED TRANSITION
▬▬▬ TESTED TRANSITION

| | TEST SEQUENCE | TOTAL WEIGHT | STATE TRANSITION NUMBER | AVERAGED WEIGHT | PRIORITY | ALL TRANSITION TESTED |
|---|---|---|---|---|---|---|
| ★ | A-B-C-D | 4 | 3 | 1.3 | 1 | no |
| | A-B-I | 2 | 2 | 1 | | |
| | A-B-E1-F1-G1 | 5 | 4 | 1.2 | 2 | no |
| | A-B-E1-H1 | 3 | 3 | 1 | 4 | no |
| ★ | A-E2-F2-G2 | 4 | 3 | 1.3 | 3 | no |
| | A-E2-H2 | 2 | 2 | 1 | | |

★ SELECTED BUT ALREADY ENTERED

——— UNTESTED TRANSITION
▬▬▬ TESTED TRANSITION

|   | TEST SEQUENCE | TOTAL WEIGHT | STATE TRANSITION NUMBER | AVERAGED WEIGHT | PRIORITY | ALL TRANSITION TESTED |
|---|---|---|---|---|---|---|
|   | A-B-C-D | 2 | 3 | 0.6 | 1 | no |
| ☆ | A-B-I | 2 | 2 | 1 | 5 | no |
|   | A-B-E1-F1-G1 | 3 | 4 | 0.7 | 2 | no |
| ★ | A-B-E1-H1 | 3 | 3 | 1 | 4 | no |
|   | A-E2-F2-G2 | 1 | 3 | 0.3 | 3 | no |
|   | A-E2-H2 | 1 | 2 | 0.5 |   |   |

☆ NEWLY ENTERED

★ SELECTED BUT ALREADY ENTERED

——— UNTESTED TRANSITION
━━━ TESTED TRANSITION

|   | TEST SEQUENCE | TOTAL WEIGHT | STATE TRANSITION NUMBER | AVERAGED WEIGHT | PRIORITY | ALL TRANSITION TESTED |
|---|---|---|---|---|---|---|
| ★ | A-B-C-D | 2 | 3 | 0.6 | 1 | no |
|   | A-B-I | 1 | 2 | 0.5 | 5 | no |
|   | A-B-E1-F1-G1 | 2 | 4 | 0.5 | 2 | no |
| ★ | A-B-E1-H1 | 2 | 3 | 0.6 | 4 | no |
|   | A-E2-F2-G2 | 1 | 3 | 0.3 | 3 | no |
|   | A-E2-H2 | 1 | 2 | 0.5 |   |   |

★ SELECTED BUT ALREADY ENTERED

— UNTESTED TRANSITION
— TESTED TRANSITION

|   | TEST SEQUENCE | TOTAL WEIGHT | STATE TRANSITION NUMBER | AVERAGED WEIGHT | PRIORITY | ALL TRANSITION TESTED |
|---|---|---|---|---|---|---|
|   | A-B-C-D | 0 | 3 | 0 | 1 | no |
| ★ | A-B-I | 1 | 2 | 0.5 | 5 | no |
|   | A-B-E1-F1-G1 | 1 | 4 | 0.2 | 2 | no |
|   | A-B-E1-H1 | 1 | 3 | 0.3 | 4 | no |
|   | A-E2-F2-G2 | 1 | 3 | 0.3 | 3 | no |
| ☆ | A-E2-H2 | 1 | 2 | 0.5 | 6 | yes |

☆ NEWLY REGISTERED

★ SELECTED BUT ALREADY ENTERED

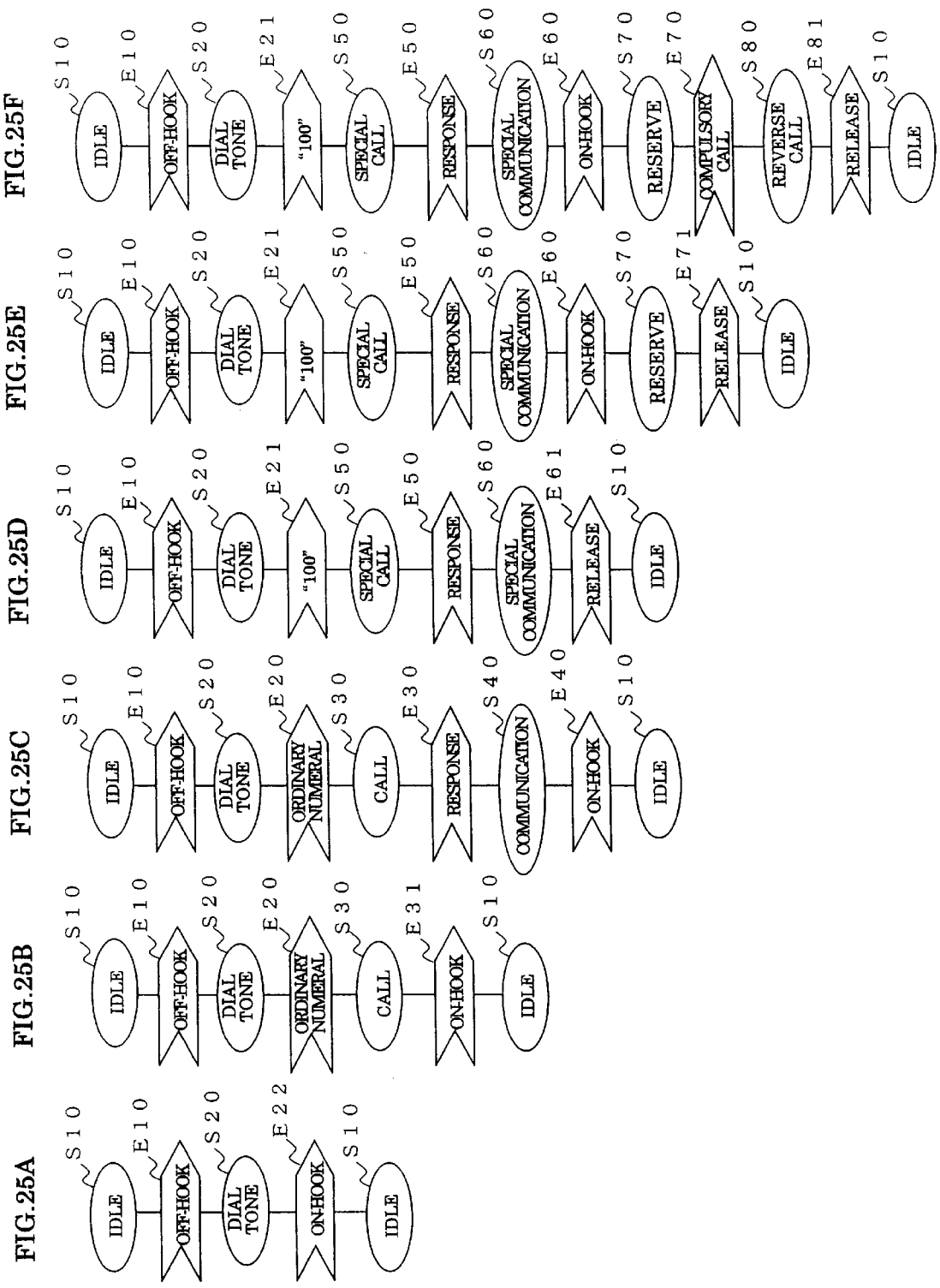

METHOD AND APPARATUS FOR SELECTING TEST SEQUENCES

BACKGROUND OF THE INVENTION

1. Field of the Invention

The present invention relates to a method and an apparatus for selecting test sequences, and in particular to a method and an apparatus for selecting test sequences in a software which has a specification prescribed by state transitions.

2. Description of the Related Art

In recent years, the selection of test sequences in testing a software which has a specification prescribed by state transitions has been generally performed by manual works. A procedure for such a manual selection of test sequences will be described referring to FIGS. 22–25.

A specification prescribed by state transitions can be composed of the combination of a preceding state Sx, an event Ey, and a subsequent state Sx+1 as shown in FIG. 22.

FIG. 23 illustrates an example of a telephone specification, as a general one, which is composed of the combination of the state transitions.

A state of "idle" (S10) in which a receiver is hanged up is an initial state (=preceding state). If an event of "off-hook" (E10) in which the receiver is picked up occurs, the preceding state (=present state) has a transition to a state of "dial tone" (S20) (=subsequent state).

This is one example of a state transition.

When the receiver is hanged up in the state of "dial tone" (S20), an event of "on-hook" (E22) occurs and the present state returns to the initial state (S10). If ordinary numerals are dialed (E20) in the state of "dial tone" (S20), the present state has a transition to a state of "call" (S30). If the call is not answered from the other end of the line, the present state returns to the initial state (S10) through an event of "on-hook" (E31). If the call is answered through an event of "response" (E30), the present state has a transition to a state of "communication" (S40), and if an event of "on-hook" (E40) occurs after the state of "communication", the present state returns to the initial state (S10).

If special numerals such as "100" are dialed (E21) in the state of "dial tone" (S20), the present state has a transition to a state of "special call" (S50). If the call is answered through an event of "response" (E50), the present state has a transition to a state of "special communication" (S60). In the state of "special call" or "special communication" (S50 or S60), the communication line will not be released even if an event of "on-hook" (E51 or E60) occurs. Instead, the present state has a transition to a state of "reserve" (S70). If a "compulsory call" is answered back from the other end of the line (E70), the present state has a transition to a state of "reverse call" (S80). If the call is answered through an event of "response" (E80), the present state returns to the state of "special communication" (S60).

In the state of "special communication", "reserve" or "reverse call" (S60, S70 or S80), if an event of "release" (E61, E71 or E81) occurs, the present state returns to the initial state (S10).

An example of the specification having the combination of the state transitions in FIG. 23 is expressed in the form of a tree as shown in FIG. 24. It is to be noted that the events are omitted in FIG. 24. If the specification can be transformed into such a tree-structured combination of state transitions, test sequences can be extracted by adopting a pre-order traversal algorithm. The test sequences which can be extracted from the tree shown in FIG. 24 can be divided into six as shown in FIGS. 25A–25F.

Among the extracted test sequences, the selection of test sequences for which an actual test should be performed is done by an examiner in charge based on his experience. When selecting test sequences, it is general that all state transitions are tested at least once without omission in which a state transition in a normal mode which is called a "main sequence" is preferentially tested with the combination of state transitions of "illegal sequences".

Such a manual selection of test sequences, when performed by an inexperienced examiner, may lead to a decrease in test efficiency due to selecting many unnecessary test sequences or to a decrease in test reliability due to failing to select necessary tests on the contrary. Also, even when performed by an experienced examiner, in case of a complicated system, the selection requires much time and causes human errors with a high possibility.

Specifically, a primary problem in the selection of test sequences arises when a specification composed of the combination of state transitions is transformed into a tree. Namely, although every node in a tree must have only one parent node, a specification composed of the combination of normal state transitions includes junctions (see ① in FIG. 23) in which a node has a plurality of parent nodes and loops (see ② in FIG. 23). Therefore, an experienced examiner is required to remove the junctions and the loops with appropriate means to transform the combination of state transitions into a tree-structure.

A secondary problem is that it is hard to appropriately select test sequences to be actually tested among all of the test sequences which can be extracted logically. Namely, since it is not practical to test all of the test sequences under the restrictions of a test term or man-hours, it is required to take time for sequentially selecting the test sequences to be actually tested in order of higher priority.

SUMMARY OF THE INVENTION

It is accordingly an object of the present invention to provide a method and an apparatus for transforming a given specification which is composed of the combination of state transitions into a tree-structure having removed therefrom junctions and loops, and for efficiently selecting appropriate test sequences.

[1] A method for selecting test sequences according to the present invention for the achievement of the above mentioned object, as schematically illustrated in FIG. 1, comprises a first step S1 for preparing tree-structured state transition data associated with state transition weights from state transition data, a second step S2 for extracting test sequences from the tree-structured state transition data, and a third step S3 for repeating processes of determining averaged weight for each of the test sequences, selecting a test sequence by which the average is maximum, and decrementing the weights contained in the selected test sequence by one unit to prioritize the test sequences.

Namely, in the first step S1, the tree-structured state transition data associated with state transition weights are prepared based on state transition data inputted as an aggregation of state transitions (see FIG. 22) and state transition weights which are inputted and set to have higher values for state transitions of more importance.

If the tree-structured state transition data are prepared, junctions and loops can be removed from the state transition data and all of the test sequences can be extracted. Therefore, in the second step S2, for example, a pre-order traversal algorithm is applied to the tree-structured state transition data, thereby extracting all of the test sequences.

For all of the test sequences extracted in the second the step S2, priorities among the test sequences are obtained in the third step S3.

Namely, in the third step S3, for all of the test sequences, the total of the state transition weights contained in each test sequence is divided by the number of the state transitions to obtain an averaged weight. The averaged weights for all of the test sequences are compared to one another, and the test sequence with the highest averaged weight is selected. Then the weights contained in the selected test sequence are decremented by one unit. Such processes are repeated until all priorities among the test sequences are determined.

Based on the priorities among the test sequences as obtained above, it is possible to omit unnecessary tests and perform only necessary tests, thus enabling an efficient selection of appropriate test sequences.

[2] In the above-mentioned invention [1], it is also possible for the third step S3 to further comprise a prioritizing step for retaining data indicating untested/tested state transitions and lowering the priority of the selected test sequence if all of the state transitions contained therein have been tested.

It is to be noted that the "data indicating untested/tested" state transitions in the third step S3 are virtual information. Namely, assuming in the third step S3 that a test sequence is actually tested every time the priority of the test sequence is determined, since all of the state transitions are "untested" in the initial state but the test sequence is actually tested every time the priority of the test sequence is determined, all of the state transitions contained in the test sequence becomes "tested".

By retaining such data indicating "untested" or "tested" state transitions, in the test sequence prioritizing step, if all of the state transitions contained in the selected test sequence are already tested, the priority of the test sequence can be lowered.

As a result, the frequency of repeatedly testing a tested state transition can be decreased, thereby enabling an efficient selection of test sequences.

[3] Also, a method for selecting test sequences according to the present invention may comprise a first step for preparing tree-structured state transition data associated with state transition weights from state transition data, a second step for extracting test sequences from the tree-structured state transition data, and a third step for retaining data indicating untested/tested state transitions to prioritize the test sequences based on the number of the untested state transitions.

Namely, in the third step S3, in order to obtain priorities among the test sequences, the data indicating untested/tested state transitions as described in the above-mentioned invention [2] are substituted for the averaged weight in the above-mentioned invention [1].

Then, the priorities among the test sequences are set so that the highest priority is set to a test sequence which contains the maximum number of the untested state transitions.

[4] Also, in the above-mentioned invention [3], if there are a plurality of test sequences containing the same number of the untested state transitions, the third step S3 may further comprise a step for prioritizing the test sequences based on the total of the weights.

Namely, in the third step S3, if there are a plurality of test sequences containing the maximum number of the untested state transitions, the prioritizing step sets the highest priority for the test sequence by which the total of the state transition weights is maximum among the plurality of test sequences.

[5] Also, the method in the above-mentioned invention [1] may further comprise a fourth step S4 for sequentially outputting a designated number of test sequences in order of higher priority.

Namely, in the fourth step S4, an examiner may designate a number of test sequences based on his experience or considering the man-hours allowed for the test, and the designated number of test sequences can be sequentially outputted in order of higher priority.

[6] Also, in the above-mentioned invention [5], if there are test sequences containing untested state transitions among the test sequences which are not included in the output by the fourth step S4, the method may further comprise a step for outputting the test sequences with warning messages.

Namely, by adding the step for outputting the test sequence, even if the number of outputting test sequences designated in the above-mentioned invention [5] is small, a principal condition that all of the state transitions are tested at least once without omission can be fulfilled.

[7] In the above-mentioned invention [5], it is also possible for the fourth step S4 to sequentially output only the number of test sequences containing untested state transitions instead of outputting the designated number of test sequences.

In the above-mentioned invention [5], the examiner designates the number of test sequences to be outputted based on his experience and the man-hours allowed for the test. However, there is a possibility that the examiner cannot specify an appropriate number due to lack of experience and the like.

Therefore, in the above-mentioned invention [7], by outputting only the test sequences which include untested state transitions, the primary condition that all of the state transitions are tested at least once without omission is fulfilled and the minimum of required test sequences can be outputted.

[8] An apparatus for realizing a method for selecting test sequences according to the present invention as shown in FIG. 1, is schematically shown in FIG. 2. As shown in FIG. 2, the apparatus comprises a tree-structure transformation portion P1 for preparing tree-structured state transition data F2 associated with state transition weights from state transition data F1, a test sequence extraction portion P2 for extracting test sequences from the tree-structured state transition data F2, and a priority decision portion P3 for repeating processes of determining averaged weight for each of the test sequences, selecting a test sequence by which the average is maximum, and decrementing the weights contained in the selected test sequence by one unit to prioritize the test sequences and enter them in a prioritized test sequence data F3.

Namely, in a tree-structure transformation portion P1, based on the state transition data F1 in which a state transition specification I1 is entered as an aggregation of state transitions (see FIG. 22) and state transition weights I2 which are set and entered with higher values for more important state transitions, the tree-structured state transition data F2 are prepared.

When the tree-structured state transition data F2 are prepared, junctions and loops can be removed from the state transition data and all of the test sequences can be extracted. Therefore, in the test sequence extraction portion P2, all of the test sequences are extracted by adopting, e.g. the pre-order traversal algorithm.

For all of the test sequences extracted in the test sequence extraction portion P2, the priorities among test sequences are determined in the priority decision portion P3.

Namely, in the priority decision portion P3, for all of the test sequences, processes are repeated for comparing the averaged weights determined by dividing the total of the state transition weights contained in each test sequence by the number of state transitions, selecting the test sequence by which the average is maximum, and decrementing the weights contained in the selected test sequence by one unit until all of the priorities among test sequences are determined.

Therefore, appropriate test sequences can be efficiently selected as in the above-mentioned invention [1].

[9] In the above-mentioned invention [8], it is also possible for the priority decision portion P3 to further comprise means for retaining data indicating untested/tested state transitions and lowering the priority of the selected test sequence if all of the state transitions contained therein have been tested.

The data indicating untested/tested state transitions retained in the priority decision portion P3 are as recited in the above-mentioned invention [2]. Therefore, by the means for lowering the priority, the frequency of repeatedly testing a tested state transition can be decreased, thereby enabling an efficient selection of test sequences.

[10] Also, an apparatus for selecting test sequences according to the present invention may comprise a tree-structure transformation portion P1 for preparing tree-structured state transition data F2 associated with state transition weights from state transition data F1, a test sequence extraction portion P2 for extracting test sequences from the tree-structured state transition data F2, and a priority decision portion P3 for retaining data indicating untested/tested state transitions to prioritize the test sequences based on the number of the untested state transitions and enter the test sequences in a prioritized test sequence data F3.

Namely, in the priority decision portion P3, in order to decide the priorities among each test sequence, the data indicating untested/tested state transitions as recited in the above-mentioned invention [9] are substituted for the averaged weight for state transitions as recited in the above-mentioned invention [8].

[11] In the above-mentioned invention [10], if there are a plurality of test sequences containing the same number of the untested state transitions, it is also possible for the priority decision portion P3 to further comprise means for prioritizing the test sequences based on the total of the weights.

Namely, in the priority decision portion P3, if there are a plurality of test sequences containing the maximum number of untested state transitions, the means for prioritizing the test sequences sets the highest priority for the test sequence by which the total of the state transition weights is the maximum among the plurality of test sequences.

[12] Also, in the above-mentioned inventions [8], the apparatus may further comprise an output portion P4 for sequentially outputting a designated number of test sequences in order of higher priority.

Namely, in the output portion P4, an examiner may designate a number of test sequences based on his experience or considering man-hours allowed for the test, and the designated number of test sequences can be sequentially outputted in order of higher priority.

[13] In the above-mentioned invention [12], if there are test sequences containing untested state transitions among the test sequences which are not included in the output by the output portion P4, the apparatus may further comprise means for outputting the test sequences with warning messages.

Namely, by adding the means for outputting the test sequences, even if the number of outputting test sequences designated in the above-mentioned invention [12] is small, the principal condition that all of the state transitions are tested at least once without omission can be fulfilled.

[14] In the above mentioned invention [12], it is also possible for the apparatus to further comprise means for sequentially outputting only the number of test sequences containing untested state transitions in order of higher priority.

In the above-mentioned invention [12], the examiner designates the number of test sequences to be outputted based on his experience and the man-hours allowed for the test. However, there is a possibility that the examiner cannot specify an appropriate number due to lack of experience and the like.

Therefore, in the above-mentioned invention [14], by outputting only the test sequences which include untested state transitions, the minimum test sequences can be outputted with the primary condition that all of the state transitions are tested at least once without omission being fulfilled.

BRIEF DESCRIPTION OF THE DRAWINGS

FIG. 10 is a diagram illustrating a state transition table in an initial state according to the present invention;

FIG. 11 is a diagram illustrating process examples of how the status of tested flag for each state transition changes according to the present invention;

FIGS. 25A–25F are diagrams illustrating examples of test sequence extracted from an example of tree-structure expression.

Throughout the figures, the same reference numerals indicate identical or corresponding portions.

DESCRIPTION OF THE EMBODIMENTS

Figure 1:
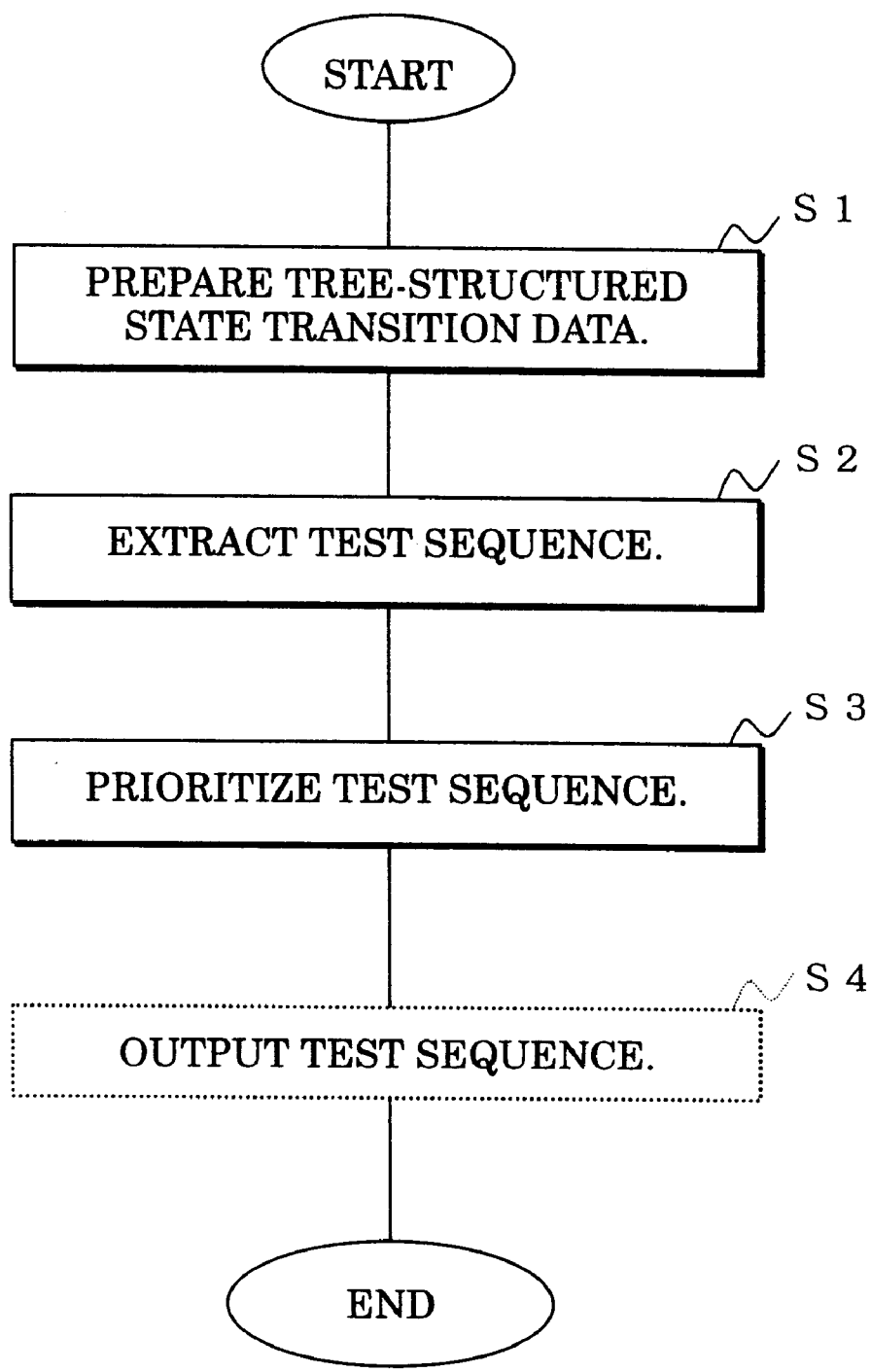
FIG. 1 is a flow chart illustrating a principle (1) of a method for selecting test sequences according to the present invention.
Figure 2:
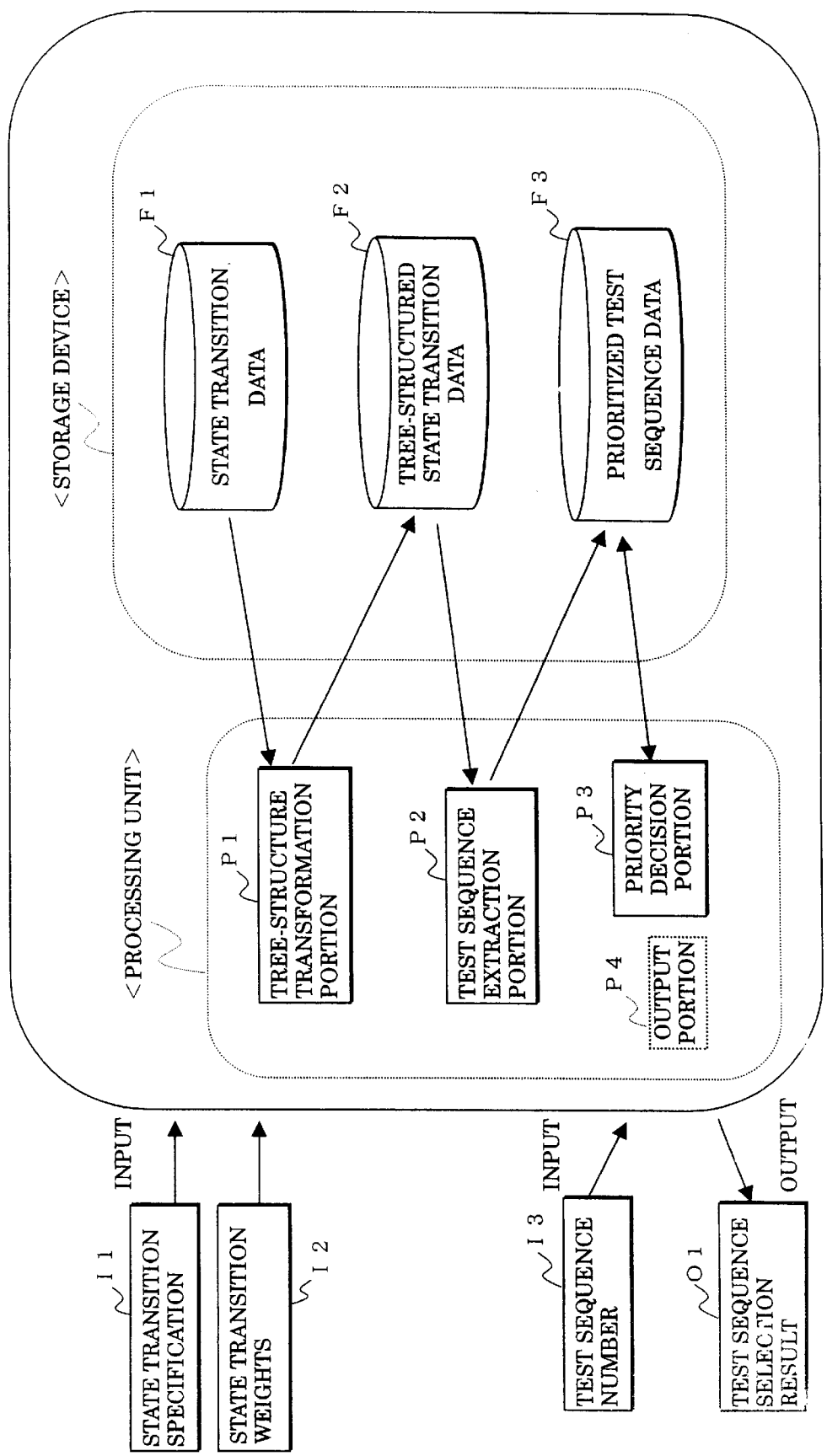
FIG. 2 is a block diagram illustrating a principle (2) of an apparatus for selecting test sequences according to the present invention.

An embodiment of the first step S1 in a method for selecting test sequences according to the present invention as shown in FIG. 1 or the tree-structure transformation portion P1 in an apparatus for selecting test sequences according to the present invention as shown in FIG. 2 will be described referring to FIGS. 3–7.

Figure 3:
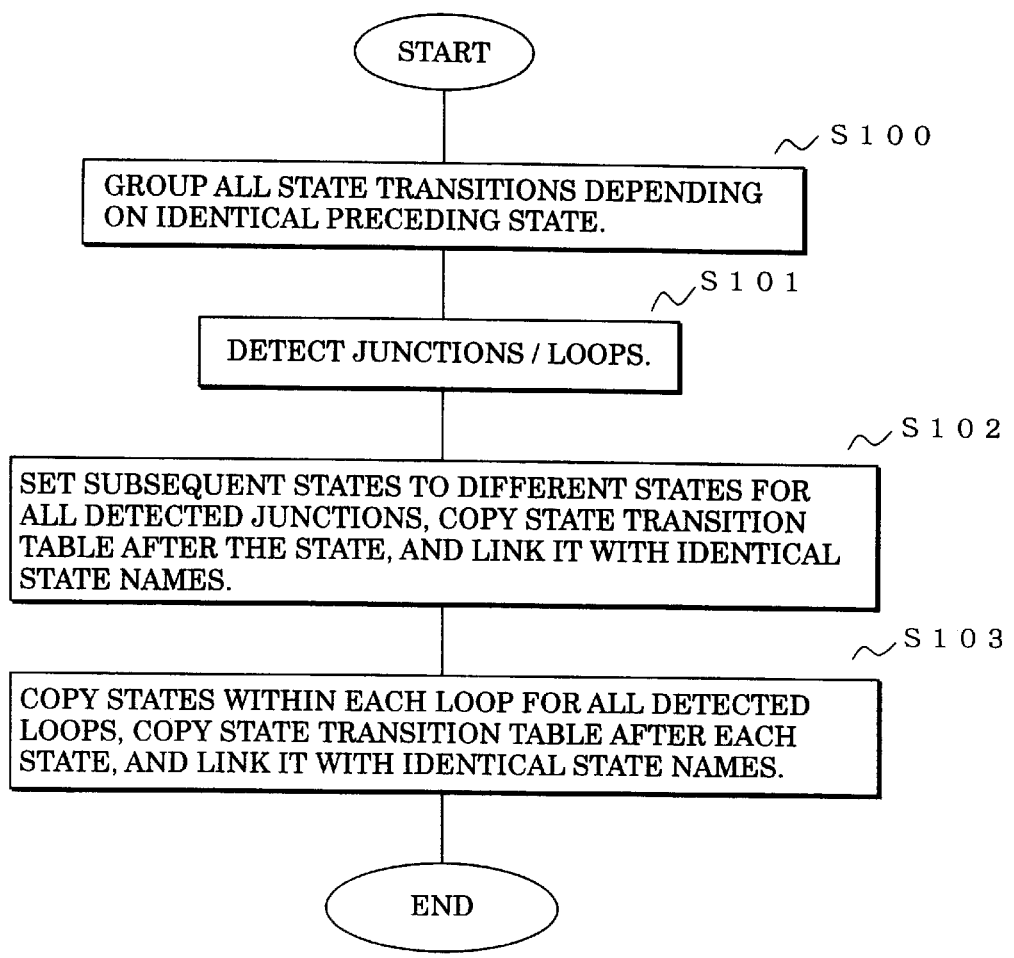
FIG. 3 is a flow chart illustrating a tree-structure transformation algorithm of state transitions used in the present invention.

FIG. 3 illustrates an algorithm for transforming state transitions into a tree. Firstly, all of the state transitions are grouped depending on identical preceding states (step S100). Then, junctions and loops are detected (step S101). Moreover, all junctions detected at step S101 are set to have different states for the subsequent ones, a state transition table after the state is copied, and linked with an identical state name (step S102).

Also, states within a loop are copied for all loops detected at S101, a state transition table after each state is copied and linked with an identical state name (step S103).

Figure 4:
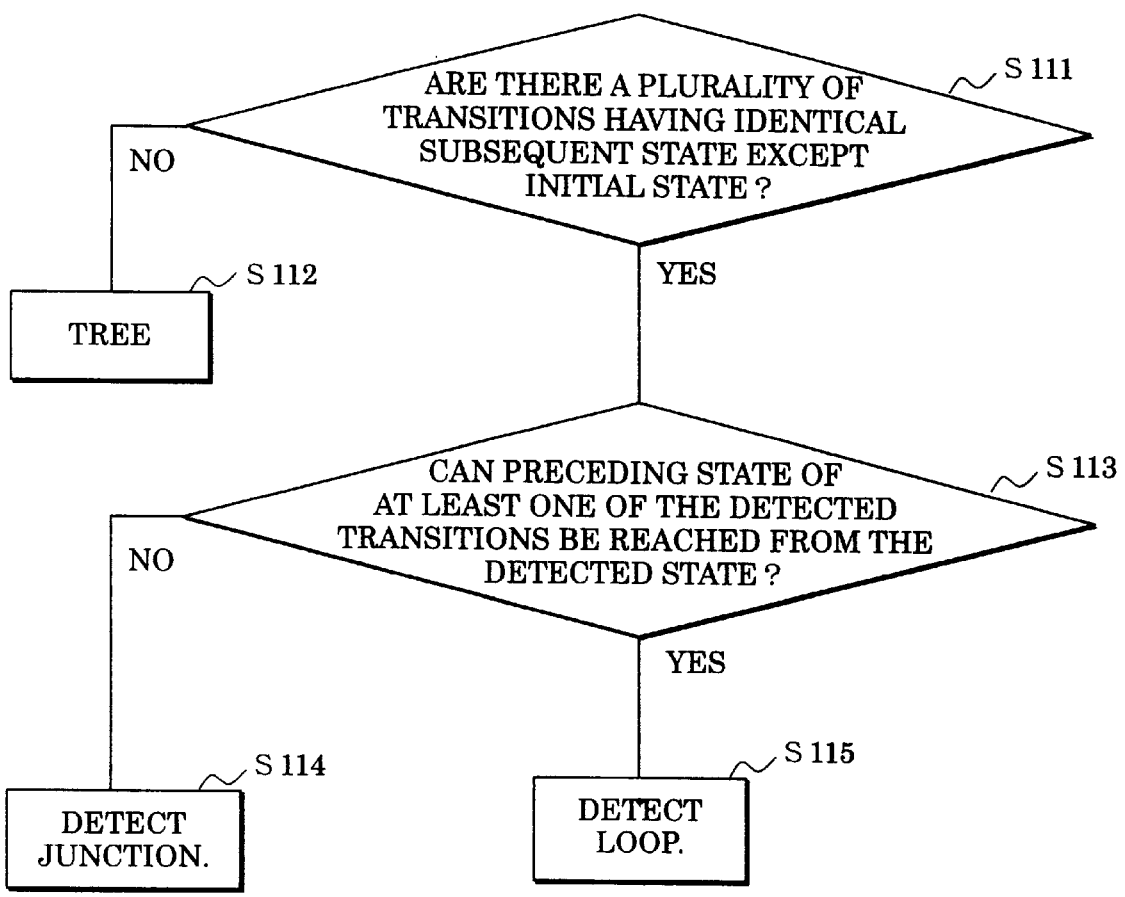
FIG. 4 is a flow chart illustrating a junction/loop detection principle used in the present invention.

FIG. 4 illustrates a detection principle when detecting junctions and loops in FIG. 3 (step S101). First of all, an aggregation of given state transitions is searched as to whether or not there are a plurality of state transitions having the same subsequent state (except the initial state) (step S111). If such state transitions exist, it is found that either a junction or a loop exists. If not, the structure is confirmed as a tree because of no junction or loop (step S112).

Distinction between a junction and a loop is made by checking whether or not the preceding state of at least one of the state transitions can be reached from the state detected at step S111 (step S113). If unreachable, a junction state is detected (step S114), while if reachable, a loop state is detected (step S115).

Figure 5:
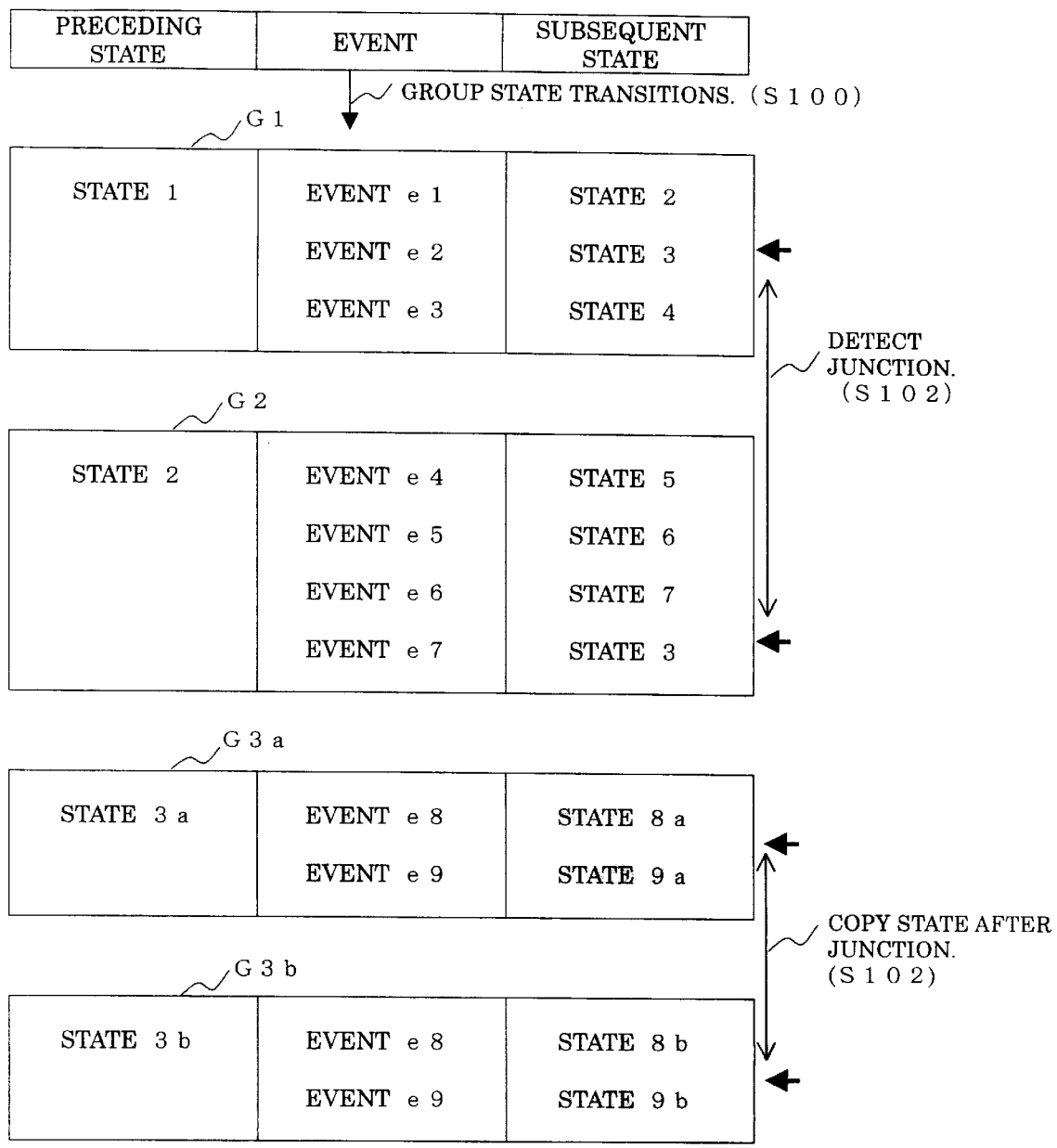
FIG. 5 is a diagram illustrating an example of state transition data structure in case a junction exists in the present invention.

FIG. 5 illustrates an example of treeing (transformation into a tree) the structure where a junction exists with reference to the algorithm shown in FIG. 3 (steps S100, S101, and S102).

Firstly, state transitions are grouped by identical preceding states. Comparing a group G1 which has a state 1 as a preceding state with a group G2 which has a state 2 as a preceding state, a state transition which has a state 3 as a subsequent state is contained in both groups. Since neither of the preceding states can be reached from the state 3, a junction is now detected (step S101). The state 3 is divided into a state 3a which is a transition from the state 1, and a state 3b which is a transition from the state 2, and state transitions after the junction are copied (step S102).

Figure 6B:
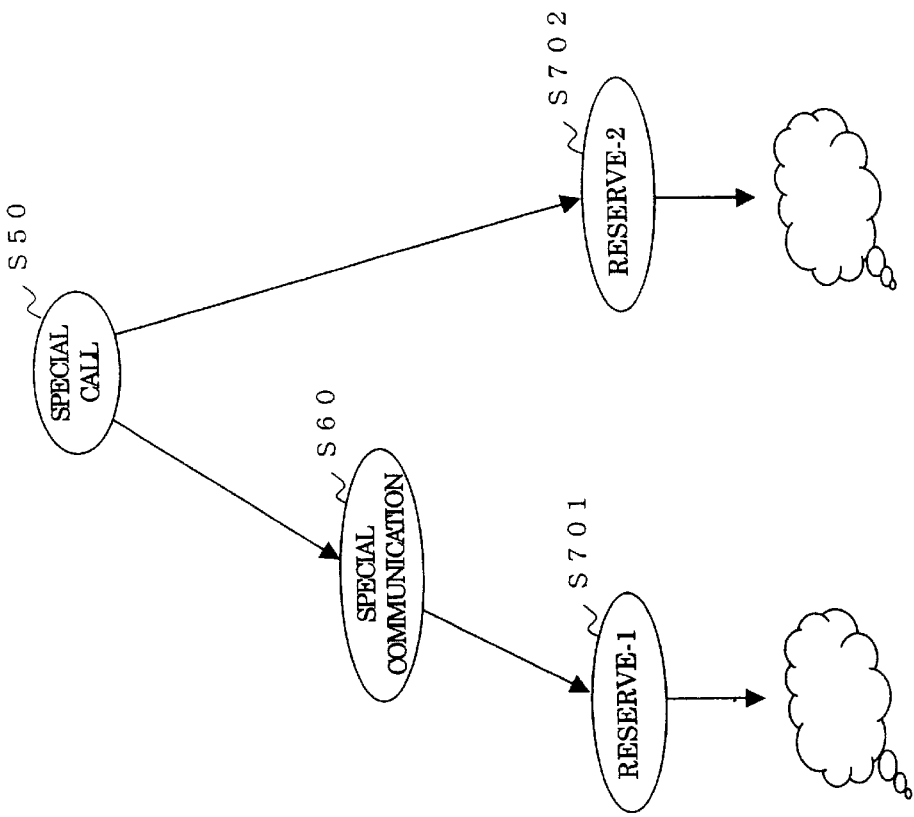
FIGS. 6A and 6B are diagrams illustrating an example of transformation into a tree-structure by removing a junction in the present invention.
Figure 6A:
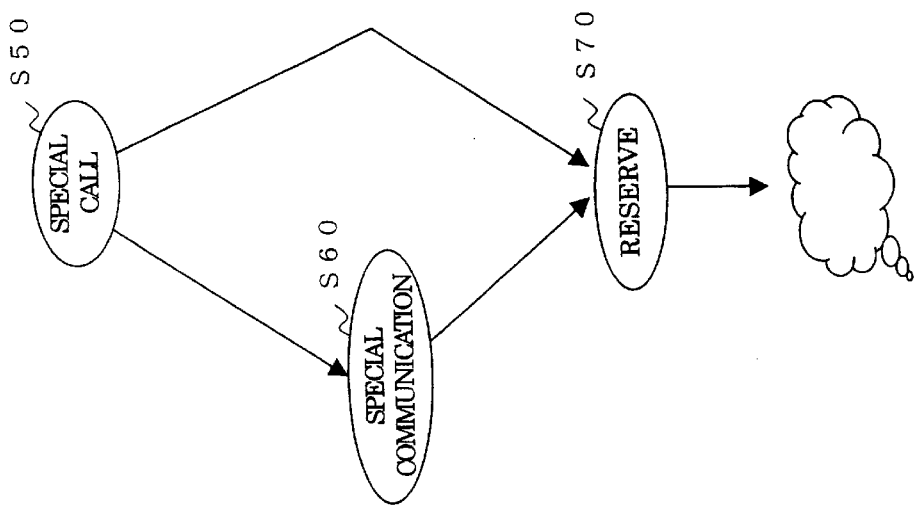
Figure 23:
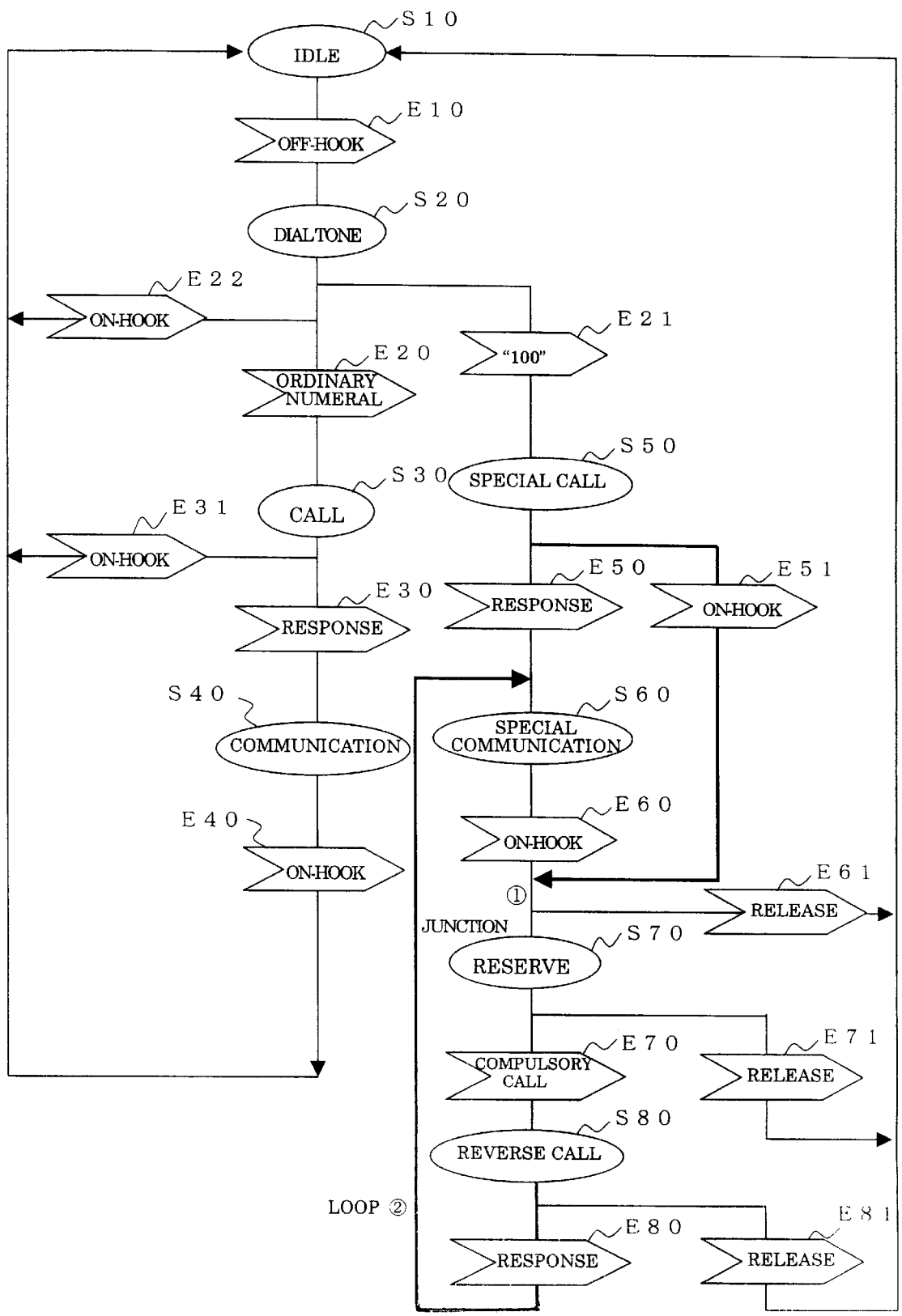
FIG. 23 is a flow chart illustrating an example of a general specification composed of a combination of state transitions.
Figure 24:
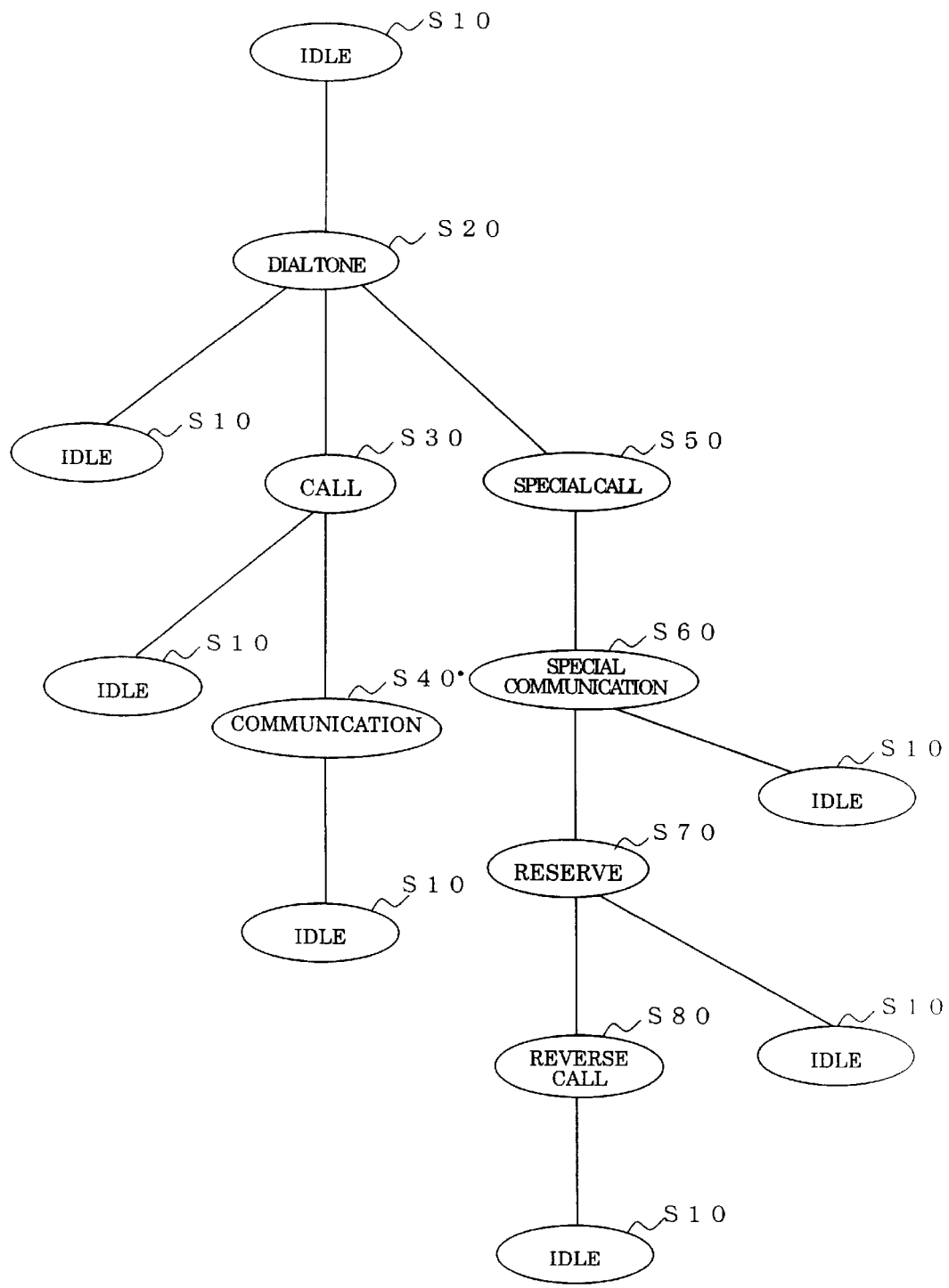
FIG. 24 is a flow chart illustrating an example of general expression of a tree-structure.

FIGS. 6A, 6B and 7 respectively illustrate how a junction (see ① in FIG. 23) and a loop (see ② in FIG. 23) are removed and transformed into a tree.

A junction at a state of reserve (S70) in FIG. 6A is removed, and state transitions thereafter are copied in the form of a reserve-1 (S701) and a reserve-2 (S702) to make a tree structure, as shown in FIG. 6B.

Figure 7A:
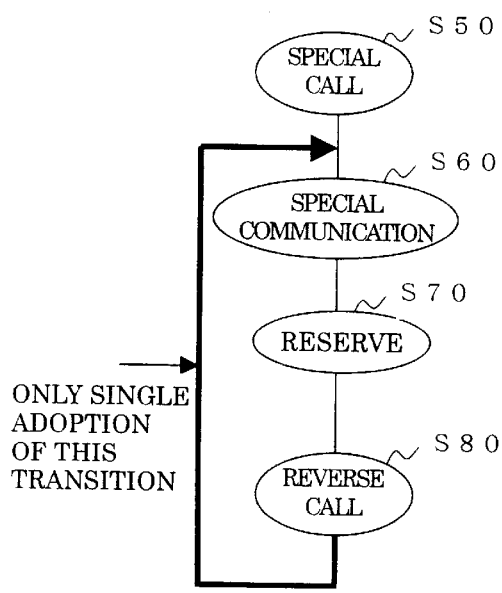
FIGS. 7A and 7B are diagrams illustrating an example of transformation into a tree-structure by removing a loop in the present invention.
Figure 7B:
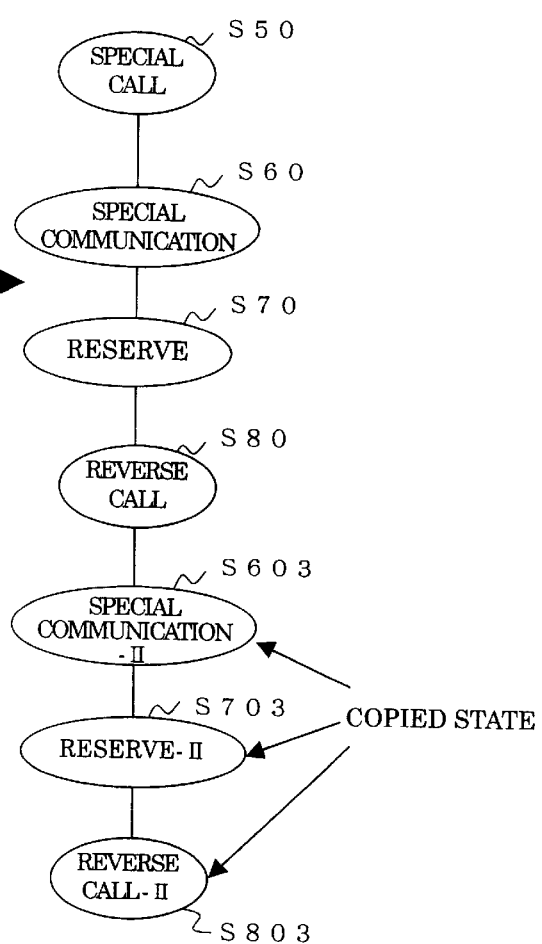

In order to remove a loop, only a single adoption of the state transition from a reverse call (S80) to a special communication (S60) is made, as shown in FIGS. 7A and 7B. Namely, the loop section which consists of the special communication (S60), a reserve (S70), and the reverse call (S80) is copied in the form of a special communication-II (S603), a reserve-II (S703), and a reverse call-II (S803) to make a tree structure.

Figure 8:
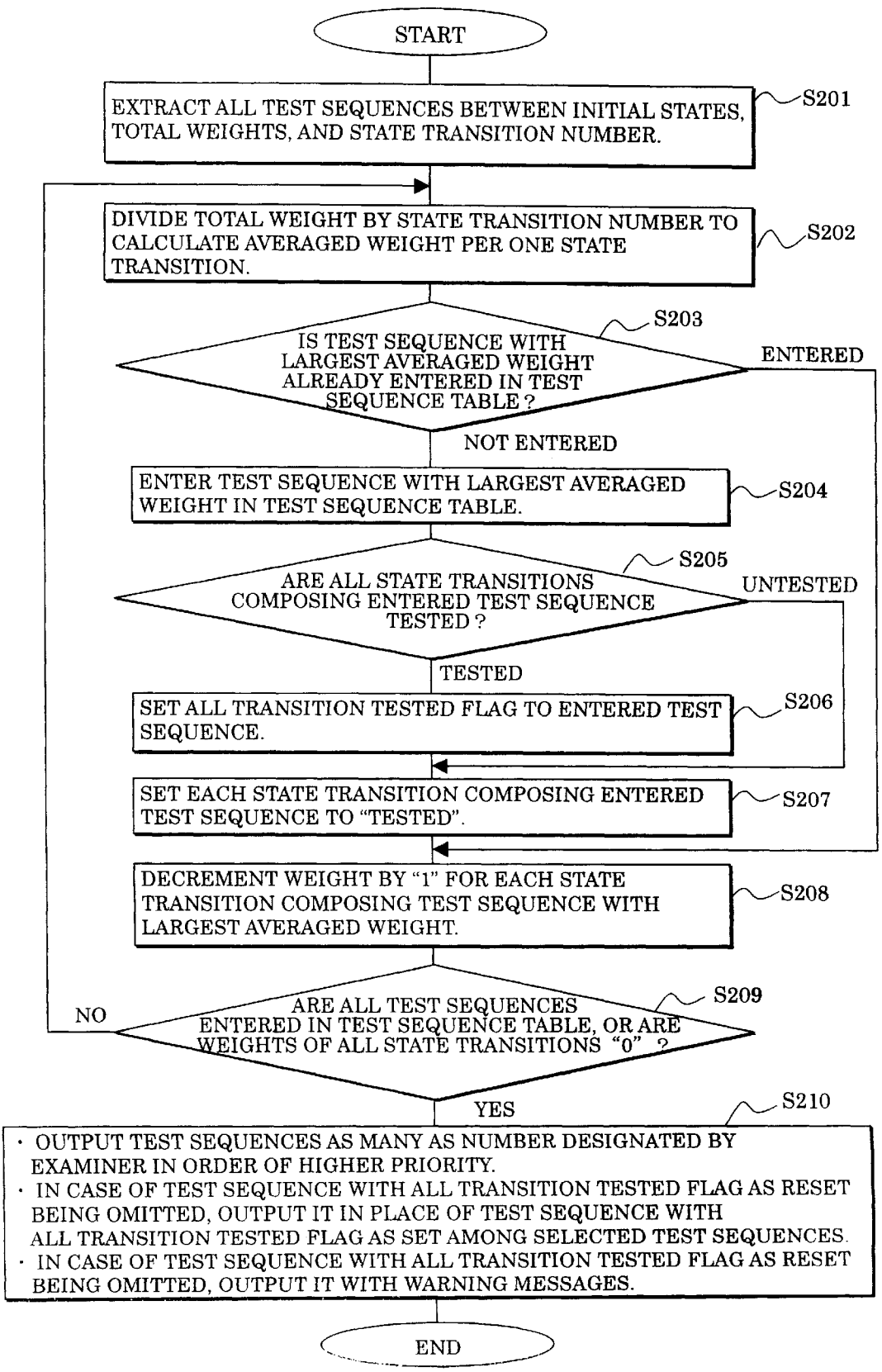
FIG. 8 is a flow chart illustrating an algorithm of prioritizing and outputting of test sequences used in a method and an apparatus for selecting test sequences according to the present invention.

FIG. 8 illustrates an embodiment of the second to the fourth steps S2–S4 in the method for selecting test sequences according to the present invention shown in FIG. 1 or the test sequence extraction portion P2, the priority decision portion P3, and the output portion P4 in the apparatus for selecting test sequences according to the present invention shown in FIG. 2.

Hereinafter, with respect to the embodiment shown in FIG. 8, based on a state transition diagram associated with weights shown in FIG. 9A, a selection method of the test sequences will be described, referring to FIG. 10 showing a state transition table in an initial state, FIG. 11 showing a flag table, and FIGS. 12A/12B–21A/21B showing processes of prioritizing the test sequences (hereinafter occasionally referred to as "processes").

As a precondition of the explanation of FIG. 8, it is assumed that the tree-structured state transition data F2 shown in FIG. 2 has already been prepared. Namely, although a junction exists in the state transition diagram shown in FIG. 9A, a tree is prepared without the junction by the above-mentioned method, as shown in FIG. 9B.

Figure 9A:
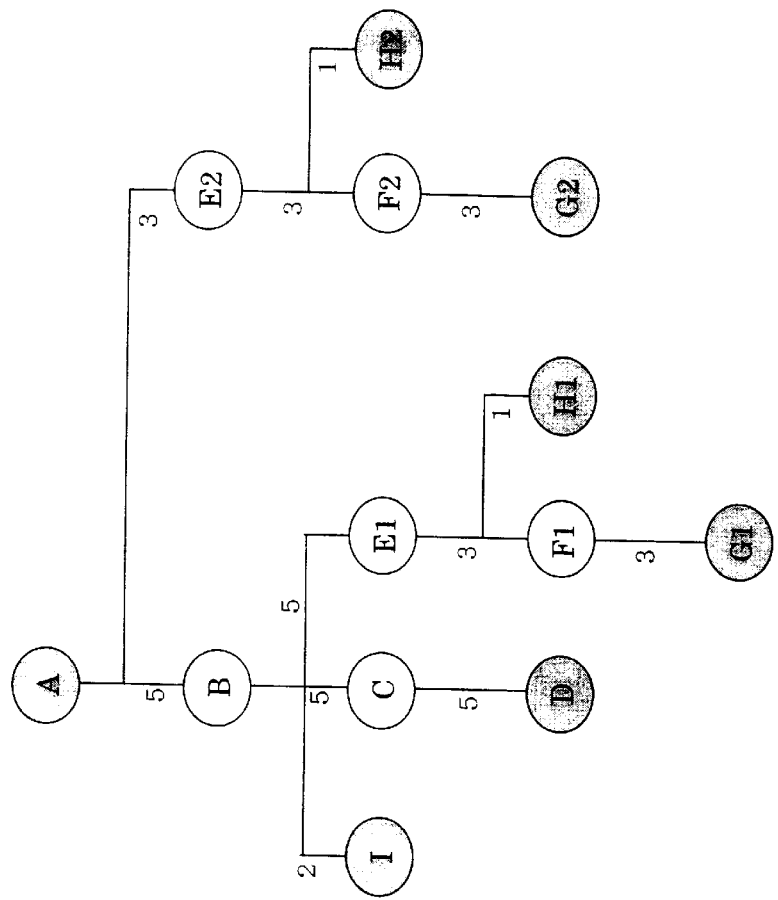
FIGS. 9A and 9B are diagrams illustrating an example of preparing a tree associated with weights according to the present invention.
Figure 9B:
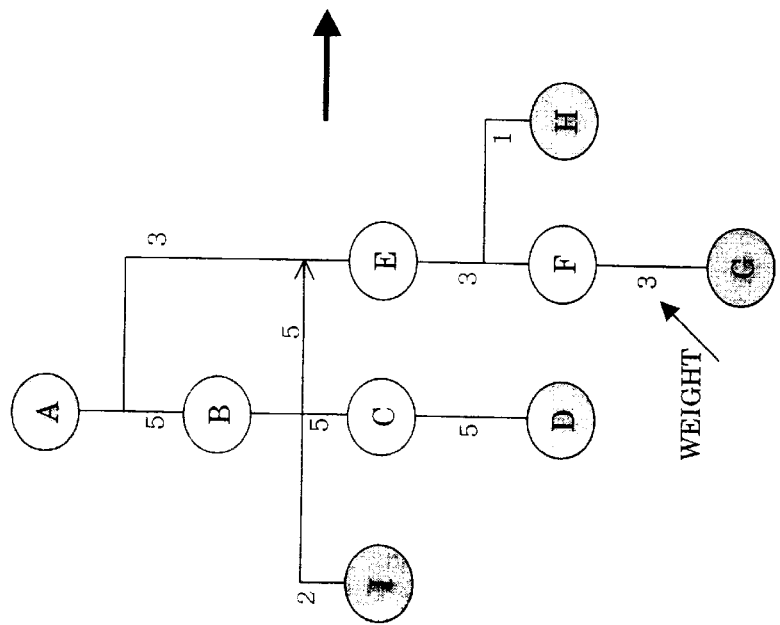

A state E in FIG. 9A is divided into a state E1 and a state E2. After the state E, a state F, a state G, and a state H are copied in the forms of a state F1, a state G1, a state H1, a state F2, a state G2, and a state H2.

The data in FIG. 9(2) can be shown in the form of a state transition table as shown in FIG. 10. It is to be noted that since FIG. 10 shows a state transition table in the initial state, a tested flag for each state transition is preset to "1" which indicates "untested".

In order to extract all of the test sequences, the total of the weights, and the number of state transitions from an initial state to the next initial state (step S201 in FIG. 8), the pre-order traversal algorithm is adopted. Specifically, six test sequences (A-B-C-D, A-B-I, A-B-E1-F1-G1, A-B-E1-H1, A-E2-F2-G2, and A-E2-H2) are provided, as shown in FIG. 12B, with the total of the weights and the number of state transitions contained in each test sequence.

Figures 12A, 12B:
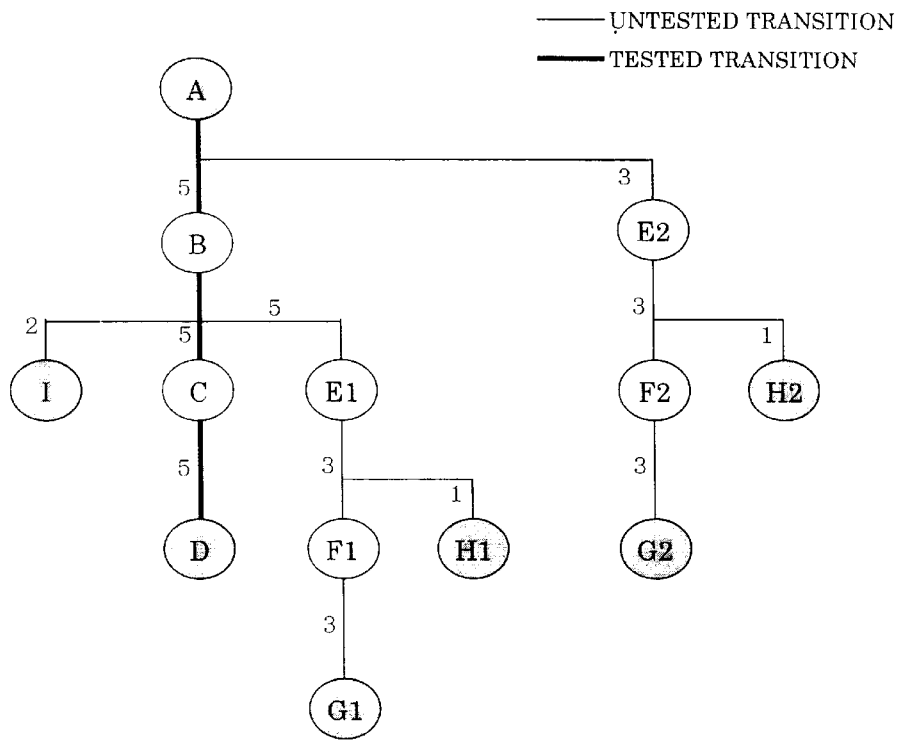
FIGS. 12A and 12B are diagrams illustrating a test sequence prioritizing process (1) according to the present invention.

Also, when the total of the weights is divided by the number of state transitions to calculate averaged weight per one state transition (step S202 in FIG. 8), the result is as shown in FIG. 12B, in which the test sequence with the maximum averaged weight is A-B-C-D (marked with "☆").

The test sequence with the maximum averaged weight is now checked as to whether or not already entered in a test sequence table (step S203 in FIG. 8). Since the test sequence A-B-C-D is the one selected first, it has not yet been entered in the test sequence table. Therefore, the test sequence A-B-C-D with the maximum averaged weight is entered in the test sequence table with a priority of "1" (step S204 in FIG. 8 and FIG. 12B).

Next, all of the state transitions composing the test sequence A-B-C-D with the maximum averaged weight are checked as to whether or not already tested just before being entered in the test sequence table (step S205 in FIG. 8). For the test sequence A-B-C-D, all of the state transitions A-B, B-C, and C-D are "untested" as shown by a "tested flag" in FIG. 10.

Therefore, the result of step S205 in FIG. 8 is "no" (untested). In the next step S207, the tested flags of the state transitions A-B, B-C, and C-D composing the test sequence A-B-C-D are reset to "0" which indicates "tested". This result is shown in a column of a process (1) in FIG. 11.

Then, the weights of the state transitions A-B, B-C, and C-D composing the test sequence A-B-C-D are decremented by "1" (step S208 in FIG. 8).

Figures 13A, 13B:
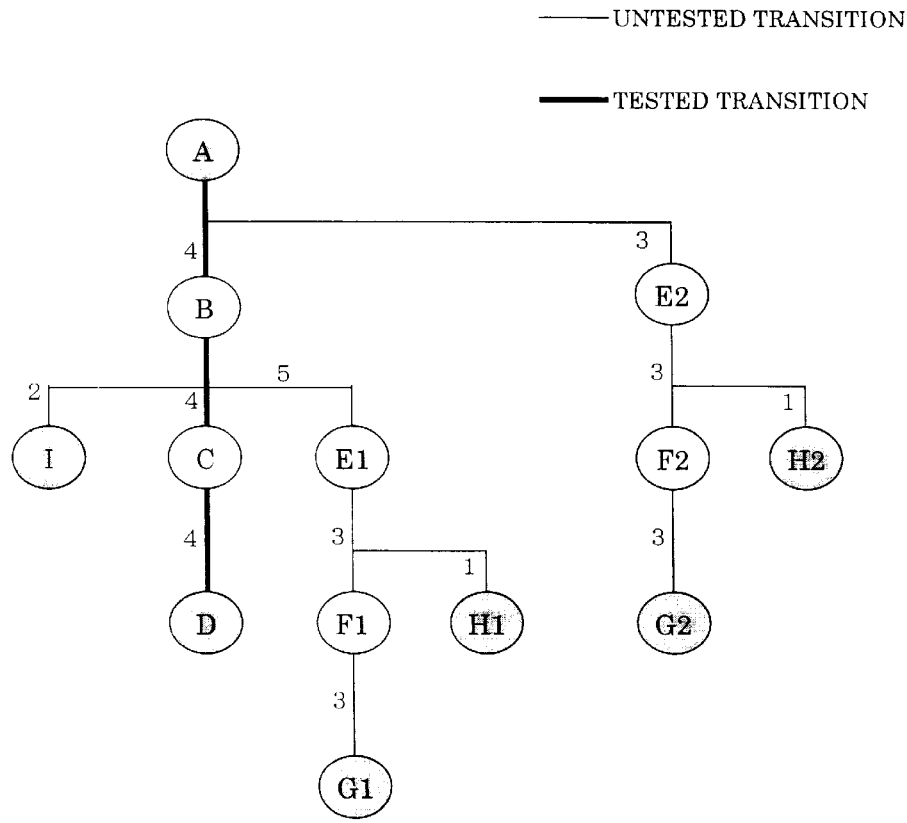
FIGS. 13A and 13B are diagrams illustrating a test sequence prioritizing process (2) according to the present invention.

FIG. 13A illustrates the state of the tree associated with the weights when a process (2) begins. As in the case of the process (1), by searching the test sequence with the maximum averaged weight, the test sequence A-B-C-D is selected again (marked with "★" in FIG. 13B).

However, since the test sequence A-B-C-D is already entered by the process (1) and the result of step S203 in FIG. 8 becomes "tested", only the decrement of the weight shown at step S208 in FIG. 8 is performed. Therefore as shown in FIG. 11, the status of the tested flag for each state transition after the completion of the process (2) remains unchanged after the completion of the process (1).

Figures 14A, 14B:
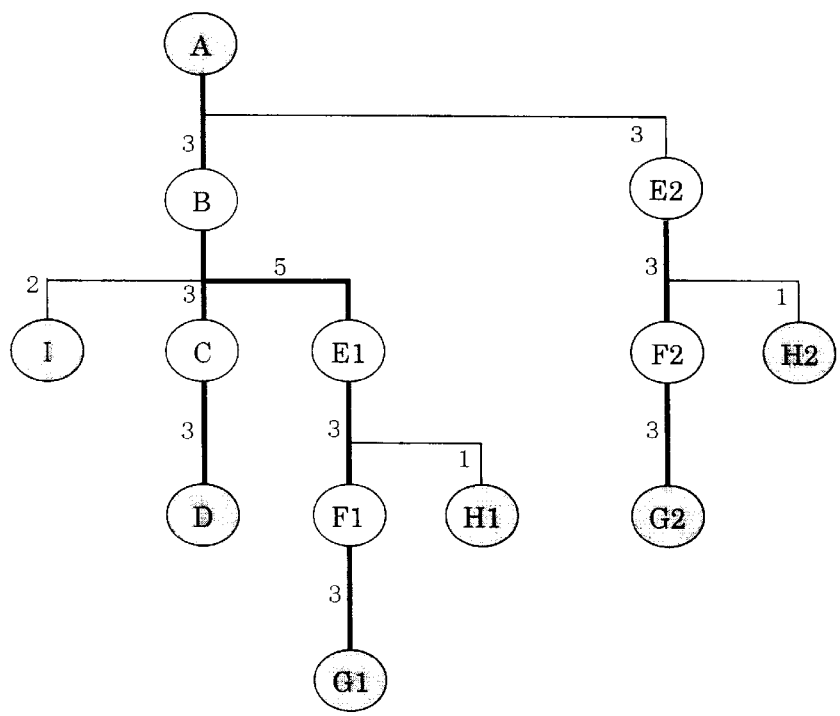
FIGS. 14A and 14B are diagrams illustrating a test sequence prioritizing process (3) according to the present invention.

Next, as shown in FIGS. 14A and 14B, in a process (3), since the averaged weight of a test sequence A-B-E1-F1-G1 becomes maximum, the test sequence A-B-E1-F1-G1 is newly entered in the test sequence table with a priority of "2" (marked with "☆" in FIG. 14B).

In this case, the state transitions of E2-F2 and F2-G2 are identical to those of E1-F1 and F1-G1, respectively. Therefore, when decrementing the weights (step S208 in FIG. 8), not only the weights of the state transitions of A-B, B-E1, E1-F1, and F1-G1 but also the weights of the divided and equivalent state transitions of E2-F2 and F2-G2 are decremented.

When performing step S207 in FIG. 8, untested state transitions B-E1, E1-F1, and F1-G1 included in the test sequence A-B-E1-F1-G1 as well as the divided and equivalent state transitions of E2-F2 and F2-G2 have the tested flags reset to "0" as shown in a column of the process (3) of FIG. 11.

Hereinafter, similar processes are repeated up to a process (10), which will be briefly described herebelow.

Figures 15A, 15B:
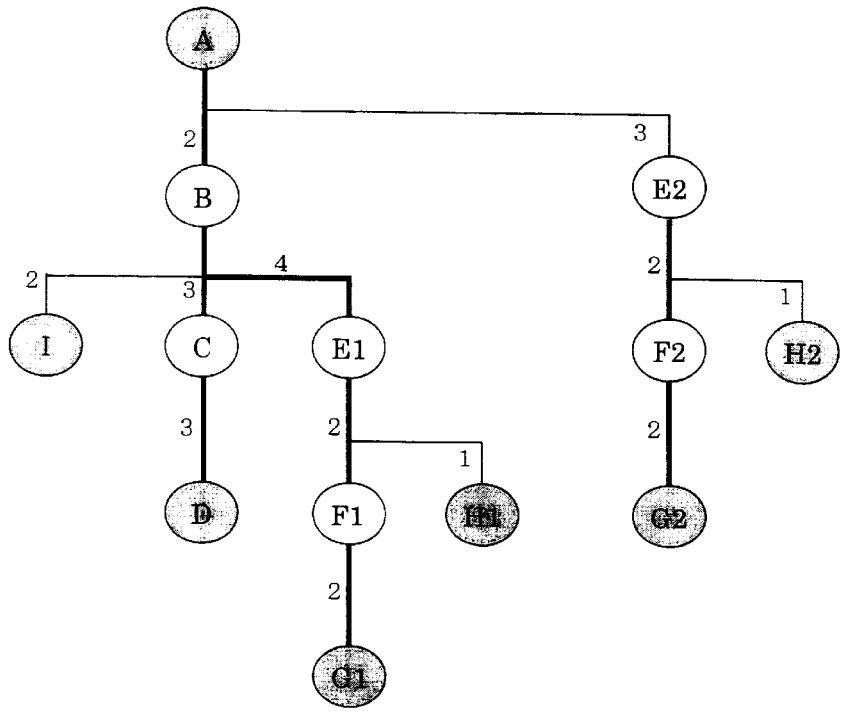
FIGS. 15A and 15B are diagrams illustrating a test sequence prioritizing process (4) according to the present invention.

As shown in FIGS. 15A and 15B, in a process (5), for a test sequence with the maximum averaged weight, the test sequence A-B-C-D is selected again (marked with "★" in FIG. 15B). However, since the test sequence A-B-C-D is already entered, a process similar to the process (2) is performed. Namely, only the decrement of the weights as shown at step S208 in FIG. 8 is performed. Therefore, as shown in FIG. 11, the status of the tested flag for each state transition after the completion of the process (4) remains unchanged after the completion of the process (3).

Figures 16A, 16B:
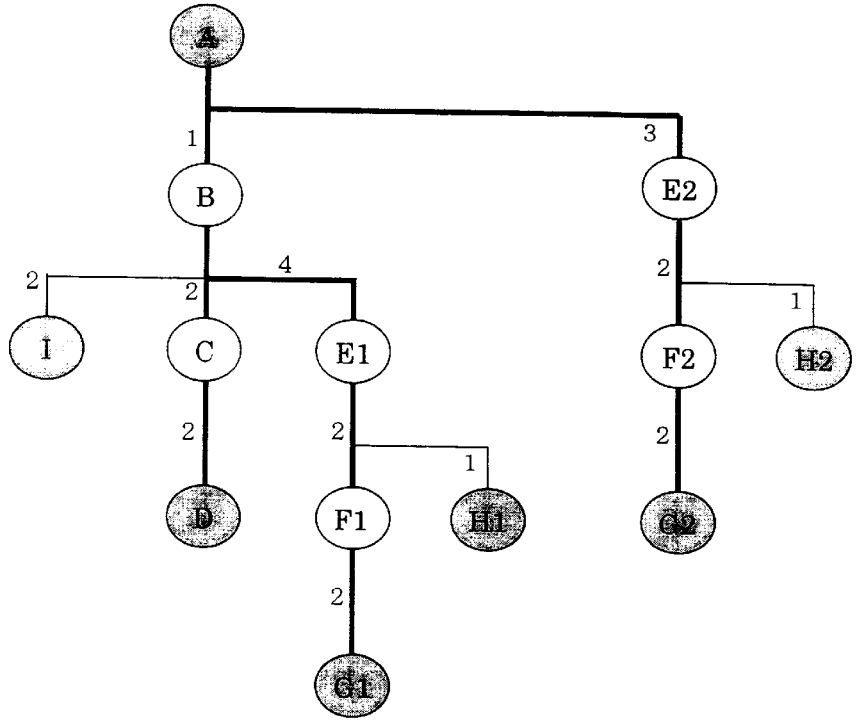
FIGS. 16A and 16B are diagrams illustrating a test sequence prioritizing process (5) according to the present invention.

As shown in FIGS. 16A and 16B, in a process (5), for a test sequence with the maximum averaged weight, a test sequence A-E2-F2-G2 is selected and newly entered in the test sequence table with a priority of "3" (marked with "☆" in FIG. 16B).

In this case, as in the process (3), not only the weights of the state transitions of A-E2, E2-F2, and F2-G2 but also the weights of the divided and equivalent state transitions of E1-F1 and F1-G1 are decremented.

When performing step S207 in FIG. 8, the tested flag of an untested state transition A-E2 included in the test sequence A-E2-F2-G2 is reset to "0" as shown in a column of the process (5) in FIG. 11.

Figures 17A, 17B:
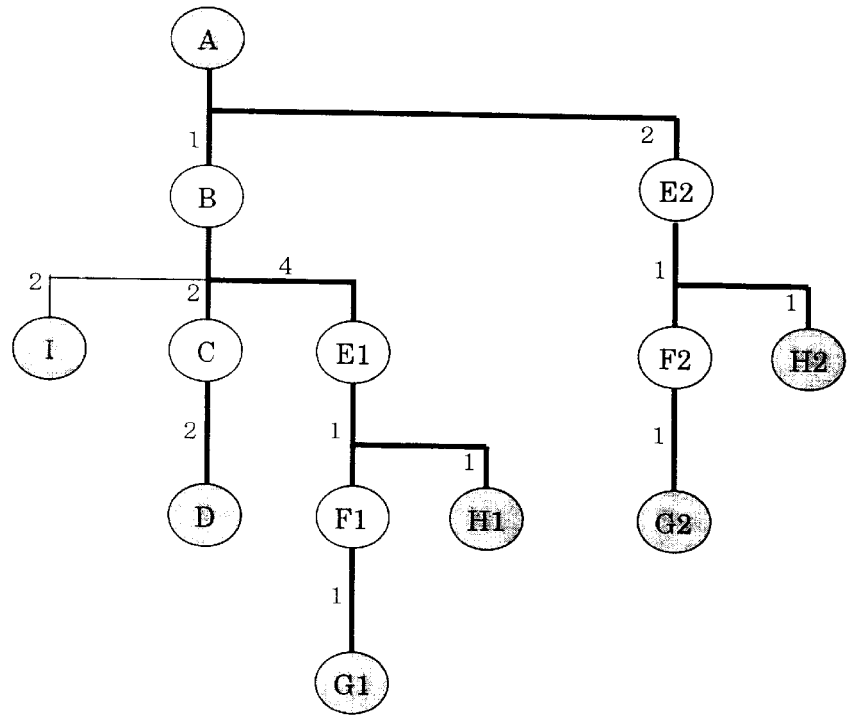
FIGS. 17A and 17B are diagrams illustrating a test sequence prioritizing process (6) according to the present invention.

As shown in FIGS. 17A and 17B, in a process (6), for a test sequence with the maximum averaged weight, a test sequence A-B-E1-H1 is selected and newly entered in the test sequence table with a priority of "4" (marked with "☆" in FIG. 17B).

In this case, as in the process (3), not only the weights of the state transitions of A-B, B-E1, and E1-H1 but also the weights of the divided and equivalent state transition of E2-H2 are decremented.

When performing step S207 in FIG. 8, the tested flags of an untested state transition E1-H1 included in the test sequence A-B-E1-H1 as well as a divided and equivalent state transition E2-H2 are reset to "0" as shown in a column of the process (6) in FIG. 11.

Figures 18A, 18B:
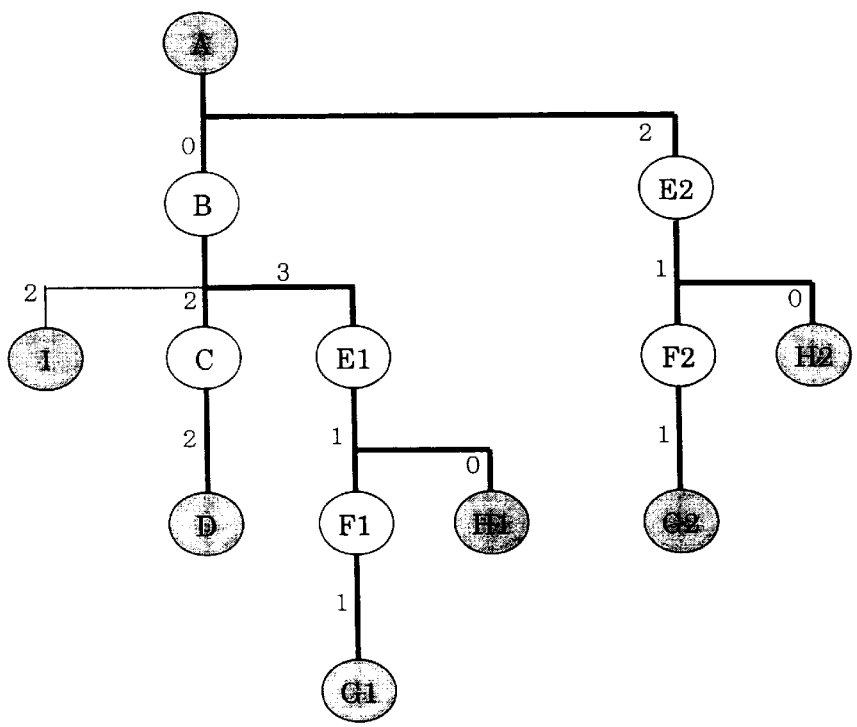
FIGS. 18A and 18B are diagrams illustrating a test sequence prioritizing process (7) according to the present invention.

As shown in FIGS. 18A and 18B, in the process (4), for test sequences with the maximum averaged weight, the test sequence A-B-C-D and the test sequence A-E2-F2-G2 are selected again (marked with "★" in FIG. 18B). However, since both of the test sequences are already entered, a process similar to the process (2) is performed.

Namely, only the decrement of the weight as shown at step S208 in FIG. 8 is performed for each test sequence.

Also, as shown in FIG. 11, the status of the tested flag for each state transition after the completion of the process (7) remains unchanged after the completion of the process (6).

Figures 19A, 19B:
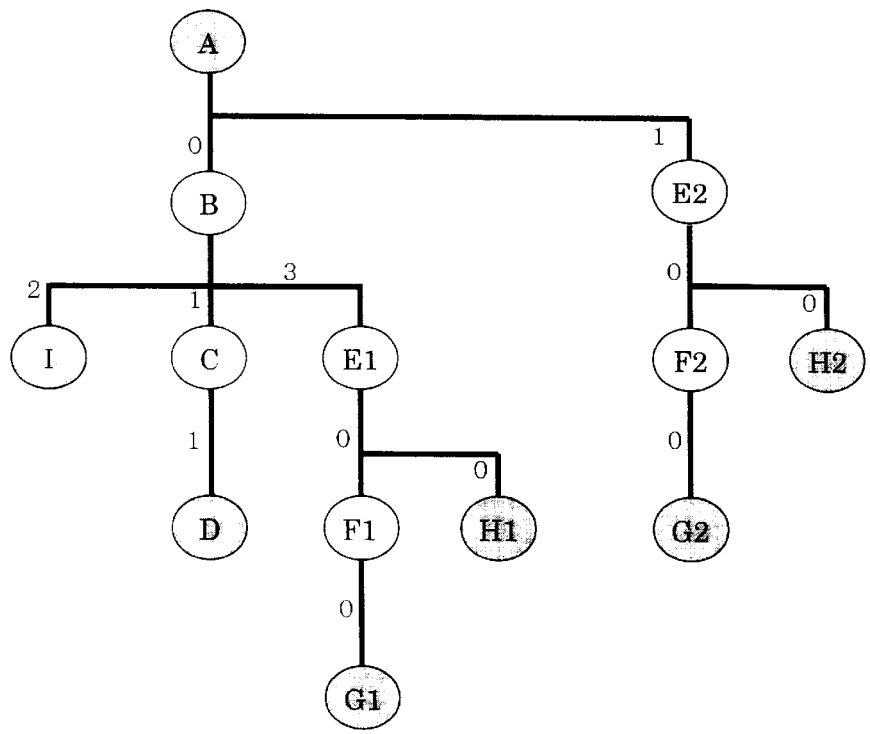
FIGS. 19A and 19B are diagrams illustrating a test sequence prioritizing process (8) according to the present invention.

As shown in FIGS. 19A and 19B, in a process (8), for test sequences with the maximum averaged weight, a test sequence A-B-I and the test sequence A-B-E1-H1 are selected. The test sequence A-B-I is newly entered in the test sequence table with a priority of "5" (marked with "☆" in FIG. 19B), while the test sequence A-B-E1-H1 is already entered (marked with "★" in FIG. 19B).

When step S208 in FIG. 8 is performed, the tested flag of a state transition B-I included in the test sequence A-B-I is reset to "0" as shown in a column of the process (8) in FIG. 11.

Figures 20A, 20B:
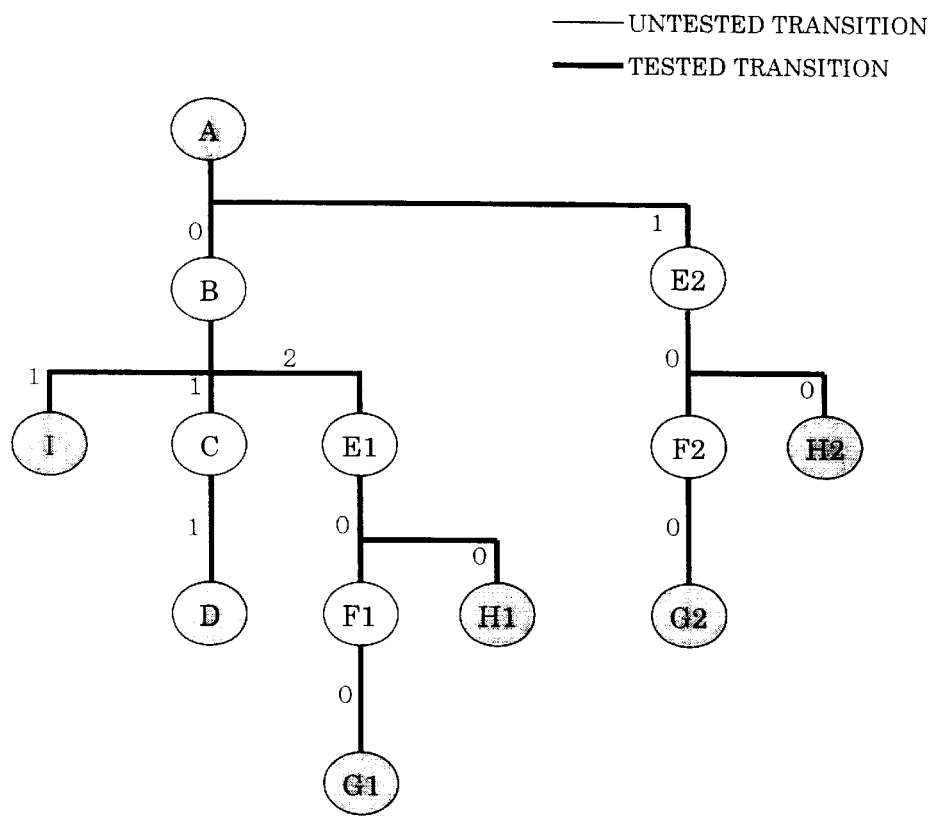
FIGS. 20A and 20B are diagrams illustrating a test sequence prioritizing process (9) according to the present invention.

As shown in FIGS. 20A and 20B, in a process (9), for test sequences with the maximum averaged weight, the test sequence A-B-C-D and the test sequence A-B-E1-H1 are selected again (marked with "★" in FIG. 20B). However, since both of the test sequences are already entered, a process similar to the process (2) is performed. Namely, only the decrement of the weights as shown at step S208 in FIG. 8 is performed for each test sequence.

Also, as shown in FIG. 11, the status of the tested flag for each state transition after the completion of the process (9) remains unchanged after the completion of the process (8).

Figures 21A, 21B:
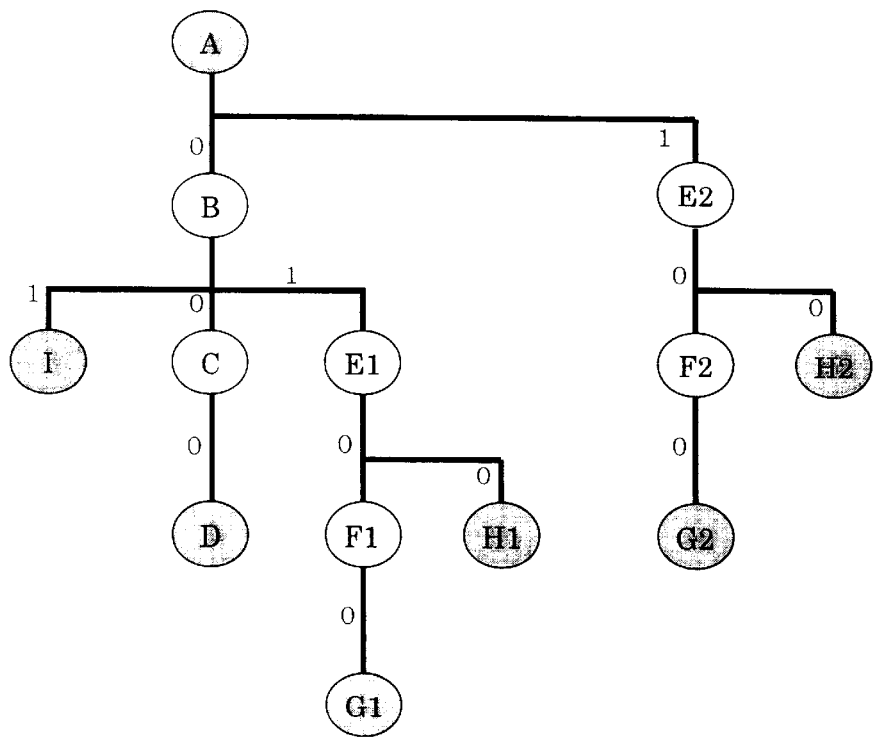
FIGS. 21A and 21B are diagrams illustrating a test sequence prioritizing process (10) according to the present invention.
Figure 22:
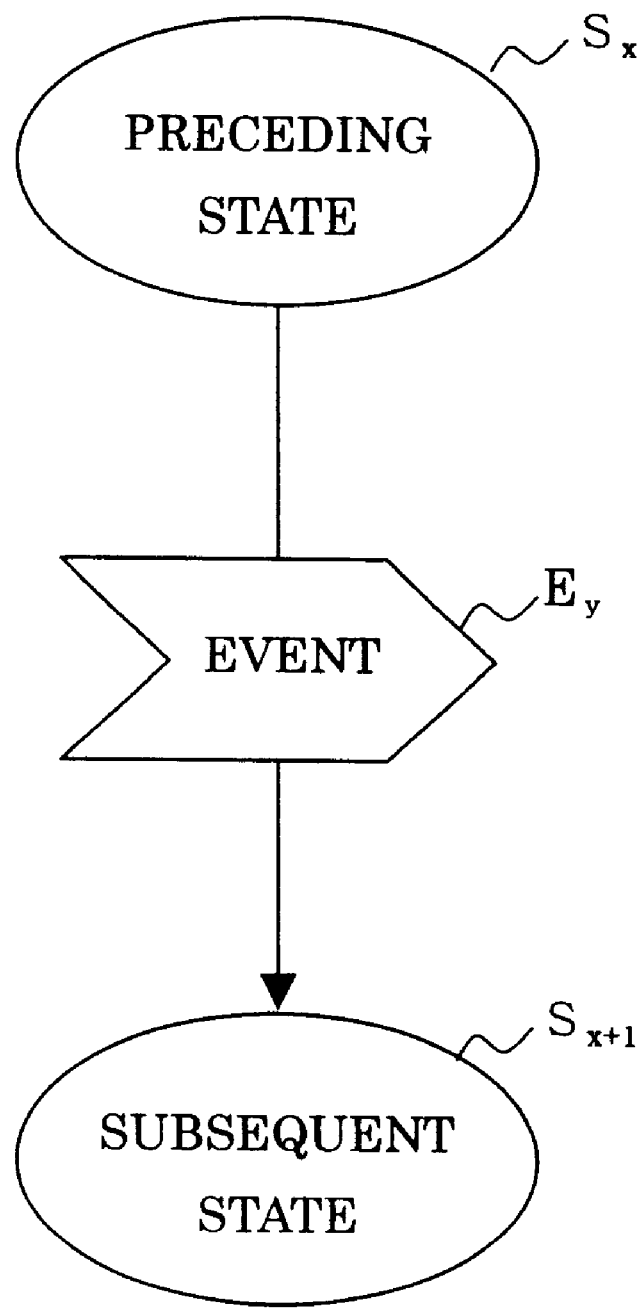
FIG. 22 is a diagram illustrating a general structure of a state transition.

As shown in FIGS. 21A and 21B, in a process (10), for test sequences with the maximum averaged weight, the test sequence A-B-I and a test sequence A-E2-H2 are selected. The test sequence A-E2-H2 is newly entered in the test sequence table with a priority of "6" (marked with "☆" in FIG. 21B), while the test sequence A-B-I is already entered (marked with "★" in FIG. 21B).

In the process (10), for the test sequence A-E2-H2 which is newly entered as the priority of "6" in the test sequence table, since all of the state transitions A-E2 and E2-H2 composing the test sequence A-E2-H2 are tested just before being entered in the test sequence table, step S206 in FIG. 8 is to be performed. Namely, an all transition tested flag of the entered test sequence A-E2-H2 is set to "yes" (see a column of "all transition tested" in FIG. 21B).

Finally, since all of the test sequences are entered sequentially in the test sequence table together with the priorities and all transition tested data, the output process will be executed (S210 in FIG. 8).

In this output process, if the number of outputs designated by an examiner is "5" or "6", the test sequences of the designated number are outputted according to the priority as shown in FIG. 21B.

As shown in FIG. 21B, when the priorities of all of the test sequences are determined, only the test sequence A-E2-H2 has the all transition tested flag set to "yes". In this embodiment, since the priority of the test sequence A-E2-H2 is the lowest, all of the test sequences having the all transition tested flag set to "no" have higher priorities than the test sequences with the all transition tested flag set to "yes".

However, in case there are test sequences with the all transition tested flag set to "no" which have a lower priority than the test sequence with the all transition tested flag set to "yes", the test sequences with the all transition tested flag set to "no" can be omitted depending on the number of outputs designated by the examiner.

In such cases, the priority of the test sequence which have the all transition tested flag set to "no" are made higher than the test sequences with the all transition tested flag set to "yes" by exchanging the priorities of the test sequences.

In this embodiment, if the number of outputs designated by the examiner is equal to or less than "4", the test sequences with the all transition tested flag set to "no" will be omitted. Therefore, the omitted test sequences can be outputted with warning messages. For example, if the output number of "4" is designated, the test sequence A-B-I is outputted with warning messages.

In the above-mentioned embodiment, the basis of prioritization is the averaged weight of the test sequence. However, the priority can be determined based on the number of untested state transitions contained in a test sequence.

In this case, based on the state transition table as shown in FIG. 10, the numbers of untested state transitions contained in each test sequence are mutually compared, and test sequences are sequentially entered in the test sequence table in order of larger numbers of the untested state transitions.

For example, since all of the state transitions are untested in the initial state, the number of untested state transitions contained in each test sequence is equal to the number of state transitions contained in each test sequence. Therefore, in this case, the test sequence A-B-E1-F1-G1 which has the largest number of state transitions which is "4" is entered in the test sequence table as a priority of "1".

As the above-mentioned processes (1)–(10), every time the priority of a test sequence is determined, the tested flag in a state transition table similar to FIG. 11 is renewed, untested state transitions contained in each test sequence are mutually compared again, thereby determining the priority in turns.

As for the output process, it is possible to have only the number of test sequences including untested state transitions outputted instead of having an examiner designate the number of test sequences to be outputted.

Namely, among the six test sequences which have the priorities determined in FIG. 21B, test sequences including the untested state transitions are five for which the all transition tested flag is set to "no". Therefore, the five test sequences are outputted in order of higher priority.

As described above, a method and an apparatus for selecting test sequences according to the present invention is arranged such that a tree-structured state transition data associated with weights are prepared from state transition data, test sequences are extracted from the tree-structured state transition data, and by repeating processes of determining averaged weight for each of the test sequences, selecting a test sequence by which the average is maximum, and decrementing the weights contained in the selected test sequence by one unit to prioritize the test sequences so that a decrease in test efficiency due to many unnecessary test sequences being selected or a decrease in test reliability due to failing to select necessary tests on the contrary which is caused when an inexperienced examiner performs the selection of test sequences can be prevented.

Even in a case where an experienced examiner performs the selection of test sequences, for a complicated system which has required much time so far, an efficient selection is enabled and occurrences of human errors can be prevented.

What we claim is:

1. A method for selecting test sequences comprising;
    a first step for preparing tree-structured state transition data associated with state transition weights from state transition data;
    a second step for extracting test sequences from the tree-structured state transition data; and
    a third step for repeating processes of determining averaged weight for each of the test sequences, selecting a test sequence by which the average is maximum, and decrementing the weights contained in the selected test sequence by one unit to prioritize the test sequences.

2. The method for selecting test sequences as claimed in claim 1 wherein the third step further comprises a prioritizing step for retaining data indicating untested/tested state transitions and lowering the priority of the selected test sequence if all of the state transitions contained therein have been tested.

3. The method for selecting test sequences as claimed in claim 1, further comprising a fourth step for sequentially outputting a designated number of test sequences in order of higher priority.

4. The method for selecting test sequences as claimed in claim 3, wherein if there are test sequences containing untested state transitions among the test sequences which are not included in the output by the fourth step, the method further comprises a step for outputting the test sequences with warning messages.

5. The method for selecting test sequences as claimed in claim 1, further comprising a fourth step for sequentially outputting only a number of test sequences containing untested state transitions in order of higher priority.

6. A method for selecting test sequences comprising;
    a first step for preparing tree-structured state transition data associated with state transition weights from state transition data;
    a second step for extracting test sequences from the tree-structured state transition data; and a third step for retaining data indicating untested/tested state transitions to prioritize the test sequences based on the number of the untested state transitions.

7. The method for selecting test sequences as claimed in claim 6, wherein if there are a plurality of test sequences containing the same number of the untested state transitions, the third step further comprises a step for prioritizing the test sequences based on the total of the weights.

8. An apparatus for selecting test sequences comprising;

tree-structure transformation means for preparing tree-structured state transition data associated with state transition weights from state transition data;

test sequence extraction means for extracting test sequences from the tree-structured state transition data; and prioritizing means for repeating processes of determining averaged weight for each of the test sequences, selecting a test sequence by which the average is maximum, and decrementing the weights contained in the selected test sequence by one unit to prioritize the test sequences.

9. The apparatus for selecting test sequences as claimed in claim 8 wherein the prioritizing means further comprise means for retaining data indicating untested/tested state transitions and lowering the priority of the selected test sequence if all of the state transitions contained therein have been tested.

10. The apparatus for selecting test sequences as claimed in claim 8, further comprising output means for sequentially outputting a designated number of test sequences in order of higher priority.

11. The apparatus for selecting test sequences as claimed in claim 10, wherein if there are test sequences containing untested state transitions among the test sequences which are not included in the output by the output means, the apparatus further comprises means for outputting the test sequences with warning messages.

12. The apparatus for selecting test sequences as claimed in claim 8, further comprising means for sequentially outputting only a number of test sequences containing untested state transitions in order of higher priority.

13. An apparatus for selecting test sequences comprising;

tree-structure transformation means for preparing tree-structured state transition data associated with state transition weights from state transition data;

test sequence extraction means for extracting test sequences from the tree-structured state transition data; and prioritizing means for retaining data indicating untested/tested state transitions to prioritize the test sequences based on the number of the untested state transitions.

14. The apparatus for selecting test sequences as claimed in claim 13, wherein if there are a plurality of test sequences containing the same number of the untested state transitions, the prioritizing means further comprise means for prioritizing the test sequences based on the total of the weights.

* * * * *